(12) United States Patent
Kim et al.

(10) Patent No.: US 12,099,215 B2
(45) Date of Patent: Sep. 24, 2024

(54) VIEWING ANGLE LIMITING APPARATUS AND DISPLAY APPARATUS COMPRISING THE SAME

(71) Applicant: LG Display Co., Ltd., Seoul (KR)

(72) Inventors: JinRyun Kim, Paju-si (KR); JaeJung Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 445 days.

(21) Appl. No.: 17/353,566

(22) Filed: Jun. 21, 2021

(65) Prior Publication Data

US 2022/0003902 A1   Jan. 6, 2022

(30) Foreign Application Priority Data

Jul. 1, 2020   (KR) .......................... 10-2020-0081182

(51) Int. Cl.
*G02B 5/22*      (2006.01)
*G02B 5/00*      (2006.01)

(52) U.S. Cl.
CPC ........ *G02B 5/003* (2013.01); *G02B 2207/123* (2013.01)

(58) Field of Classification Search
CPC .................. G02B 5/003; G02B 2207/123; G02B 5/1809; G02B 5/0236; G02B 5/0278; G02B 5/00; G02B 5/02; G02B 5/22; G02F 1/1335
See application file for complete search history.

(56) References Cited

U.S. PATENT DOCUMENTS

| | | | | |
|---|---|---|---|---|
| 5,104,210 A | * | 4/1992 | Tokas | ....................... G02B 1/10 |
| | | | | 427/598 |
| 5,795,643 A | * | 8/1998 | Steininger | ............. G09F 3/0292 |
| | | | | 428/172 |
| 6,398,370 B1 | * | 6/2002 | Chiu | ...................... G02B 5/003 |
| | | | | 428/167 |
| 7,326,504 B2 | * | 2/2008 | Graham | ............... G03G 7/0026 |
| | | | | 430/10 |
| 10,234,677 B1 | * | 3/2019 | Guntaka | ................ G02B 5/201 |

(Continued)

FOREIGN PATENT DOCUMENTS

KR   10-2017-0099457 A   9/2017
KR      10-2096266 B1    4/2020

*Primary Examiner* — Balram T Parbadia
(74) *Attorney, Agent, or Firm* — SEED IP LAW GROUP LLP

(57) ABSTRACT

A viewing angle limiting apparatus and a display apparatus are provided. The apparatus comprises a first optical member having a plurality of lower light shielding members, and a second optical member having a plurality of upper light shielding members and facing the first optical member. Each of the plurality of upper light shielding members may be spaced apart from each of the plurality of lower light shielding members in a thickness direction of the first optical member and disposed to be alternate with each of the plurality of lower shielding members. Therefore, since a length of each of the lower light shielding members and the upper light shielding members may be formed to be short, the light shielding members may be manufactured more easily than the case that one light shielding member is provided longitudinally up and down, and a defect rate may be lowered, whereby productivity may be enhanced.

20 Claims, 12 Drawing Sheets

(56) References Cited

U.S. PATENT DOCUMENTS

| | | | |
|---|---|---|---|
| 2006/0176554 A1* | 8/2006 | Kuo | G02B 6/06 |
| | | | 385/115 |
| 2012/0033304 A1* | 2/2012 | Kim | G02B 5/0278 |
| | | | 359/614 |
| 2014/0204464 A1* | 7/2014 | Halverson | G02F 1/133524 |
| | | | 359/599 |
| 2014/0340752 A1* | 11/2014 | Kusama | G02B 5/021 |
| | | | 427/553 |
| 2015/0136306 A1* | 5/2015 | Wakamatsu | B32B 38/0004 |
| | | | 156/182 |
| 2016/0124126 A1* | 5/2016 | Vasylyev | G02B 5/003 |
| | | | 359/893 |
| 2018/0120581 A1* | 5/2018 | Ouderkirk | H01L 31/054 |
| 2019/0100853 A1* | 4/2019 | Shiota | G02B 27/142 |
| 2019/0146129 A1* | 5/2019 | Mockarram-Dorri | G02B 6/00 |
| | | | 359/630 |
| 2019/0346600 A1* | 11/2019 | Wheatley | G02B 5/201 |
| 2019/0346615 A1* | 11/2019 | Johnson | G02B 5/00 |
| 2021/0333624 A1* | 10/2021 | Schmidt | G02F 1/133524 |

\* cited by examiner

VIEWING ANGLE LIMITING APPARATUS AND DISPLAY APPARATUS COMPRISING THE SAME

CROSS-REFERENCE TO RELATED APPLICATIONS

This application claims the benefit of the Korean Patent Application No. 10-2020-0081182, filed Jul. 1, 2020, which is hereby incorporated by reference as if fully set forth herein.

BACKGROUND

Technical Field

The present disclosure relates to a viewing angle limiting apparatus for limiting a viewing angle and a display apparatus comprising the same.

Discussion of the Related Art

With the advancement of the information age, the demand for a display apparatus for displaying an image has increased with various forms. Therefore, various types of display apparatuses such as a liquid crystal display (LCD) apparatus, a light emitting display apparatus, an organic light emitting display (OLED) apparatus, a micro light emitting display apparatus, and a quantum dot light emitting display apparatus have been recently used.

These display apparatuses are generally developed to have a wide viewing angle, thereby allowing a user to view an image in various angle directions. However, when the display apparatus has a wide viewing angle, since it may adversely affect characteristics of a product, a narrow viewing angle may be required.

For example, in case of an automated teller machine (ATM) of a bank, since it is required to allow another person near a user not to recognize personal information when the user inputs the personal information, it is more preferable that a display apparatus has a narrow viewing angle. Also, in case of a navigation system of a vehicle, when a viewing angle of a display apparatus is wide, light may be reflected in a wind shield of a front surface of the vehicle during nighttime driving, whereby it may adversely affect safety driving of a driver. Also, in case of a computer or a cellular phone, when a viewing angle of a display apparatus is wide even in the case that a user does not want to expose a privacy, it is contrary to the user's request.

Therefore, studies for a viewing angle limiting apparatus for limiting a viewing angle to be suitable for a request status have been actively ongoing.

BRIEF SUMMARY

The present disclosure has been made in view of one or more problems in the related art, and one or more embodiments of the present disclosure provide a viewing angle limiting apparatus for limiting a viewing angle and a display apparatus comprising the same.

One or more embodiments of the present disclosure provide a viewing angle limiting apparatus capable of enhancing productivity and a display apparatus comprising the same.

In addition to the technical benefits of the present disclosure as mentioned above, additional benefits and features of the present disclosure will be clearly understood by those skilled in the art from the following description of the present disclosure.

In accordance with an aspect of the present disclosure, the above and other benefits can be accomplished by the provision of a viewing angle limiting apparatus comprising a first optical member having a plurality of lower light shielding members, and a second optical member having a plurality of upper light shielding members and facing the first optical member, wherein each of the plurality of upper light shielding members may be spaced apart from each of the plurality of lower light shielding members in a thickness direction of the first optical member and disposed to be alternate with each of the plurality of lower shielding members.

In accordance with another aspect of the present disclosure, the above and other benefits can be accomplished by the provision of a viewing angle limiting apparatus comprising a first base film, a second base film facing the first base film, a first optical layer having a plurality of lower light shielding members disposed on the first base film, a second optical layer having a plurality of upper light shielding members disposed on the second base film, and an intermediate layer disposed between the first optical layer and the second optical layer, wherein the respective lower light shielding members may be disposed between the respective upper light shielding members.

In accordance with still another aspect of the present disclosure, the above and other benefits can be accomplished by the provision of a display apparatus comprising a display panel displaying an image, and a viewing angle limiting panel coupled to the display panel, wherein the viewing angle limiting panel includes a first optical member having a plurality of lower light shielding members, and a second optical member having a plurality of upper light shielding members and facing the first optical member, wherein each of the plurality of upper light shielding members is spaced apart from each of the plurality of lower light shielding members in a thickness direction of the first optical member and disposed to be alternate with each of the plurality of lower shielding members.

In accordance with further still another aspect of the present disclosure, the above and other benefits can be accomplished by the provision of a display apparatus comprising a display panel for displaying an image, and a viewing angle limiting panel coupled to the display panel, wherein the viewing angle limiting panel may include a first base film, a second base film facing the first base film, a first optical layer having a plurality of lower light shielding members disposed on the first base film, a second optical layer having a plurality of upper light shielding members disposed on the second base film, and an intermediate layer disposed between the first optical layer and the second optical layer, and the respective lower light shielding members may be disposed between the respective upper light shielding members.

BRIEF DESCRIPTION OF THE SEVERAL VIEWS OF THE DRAWINGS

The above and other benefits, features and other advantages of the present disclosure will be more clearly understood from the following detailed description taken in conjunction with the accompanying drawings, in which.

DETAILED DESCRIPTION

Figure 1:
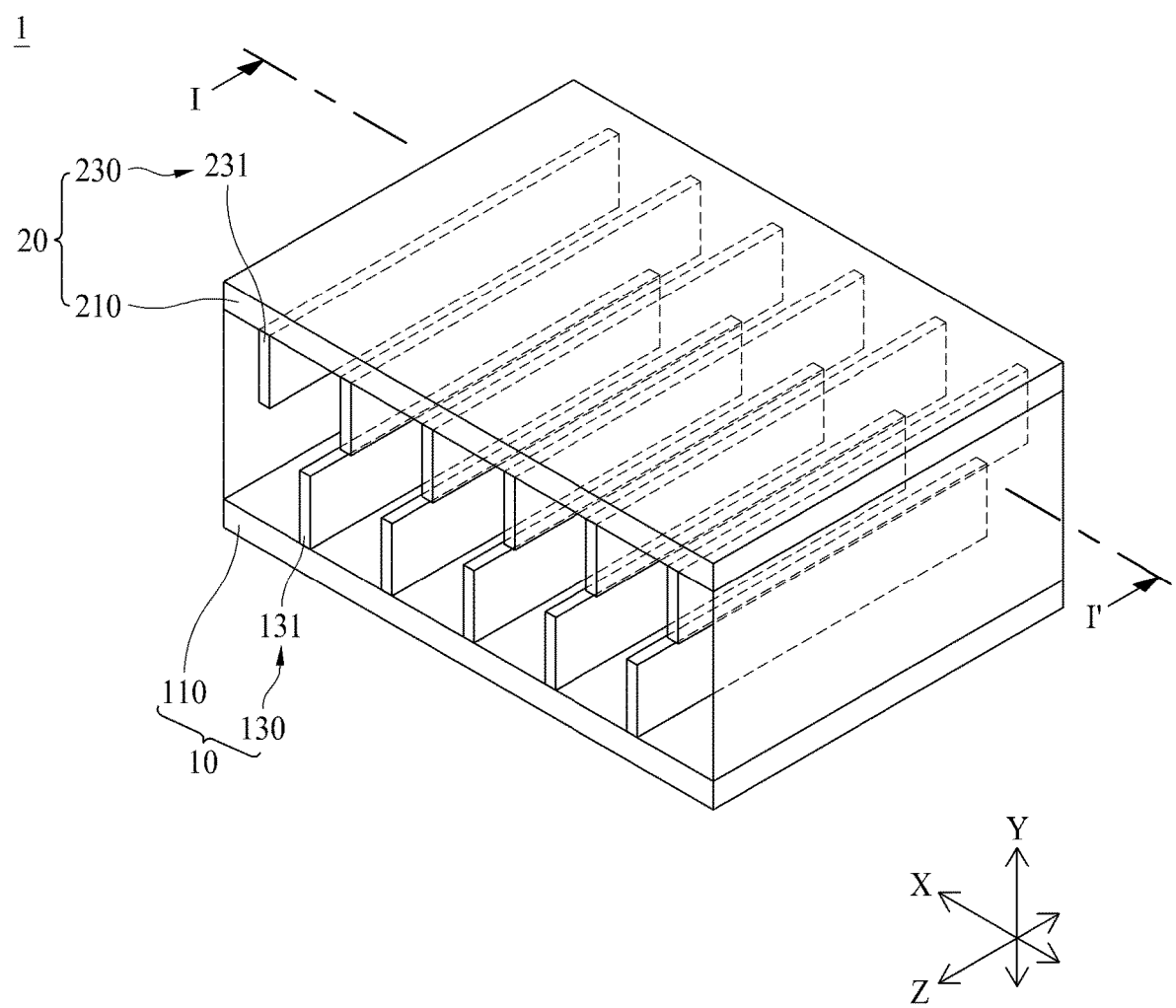
FIG. 1 is a schematic perspective view illustrating a viewing angle limiting apparatus according to one embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

It will be understood that, although the terms "first," "second," etc., may be used herein to describe various elements, these elements should not be limited by these terms. These terms are only used to partition one element from another. For example, a first element could be termed a second element, and, similarly, a second element could be termed a first element, without departing from the scope of the present disclosure.

In describing elements of the present disclosure, terms such as "first" and "second" may be used. These terms are intended to identify the corresponding elements from the other elements, and basis, order, or number of the corresponding elements are not limited by these terms. The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists therebetween.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, an embodiment of a viewing angle limiting apparatus according to the present disclosure will be described in detail with reference to the accompanying drawings. Wherever possible, the same reference numbers will be used throughout the drawings to refer to the same or like parts.

Figure 2:
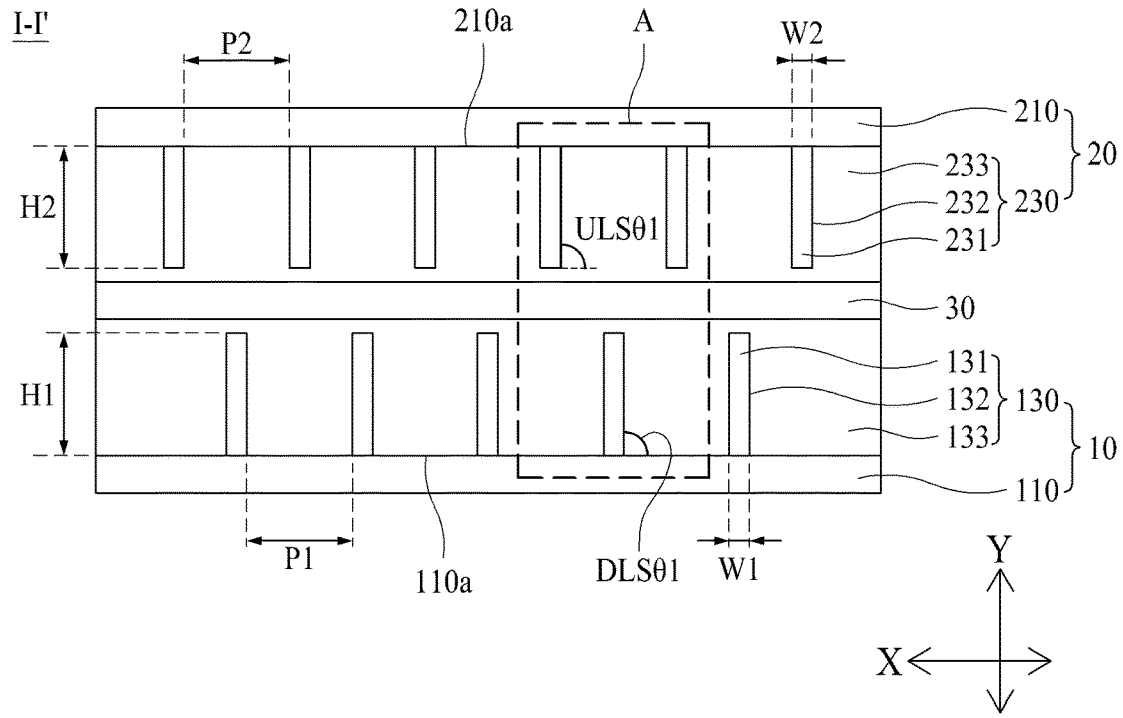
FIG. 2 is a sectional view taken along line I-I' shown in FIG. 1.
Figure 3:
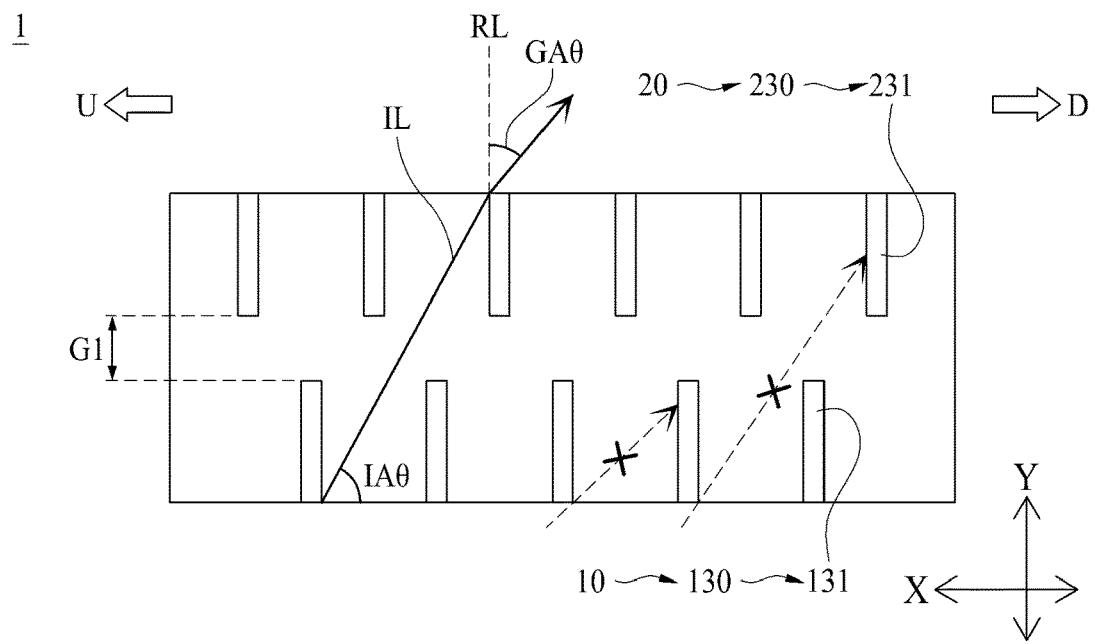
FIG. 3 is a schematic view illustrating a light path of FIG. 2.

FIG. 1 is a schematic perspective view illustrating a viewing angle limiting apparatus according to one embodiment of the present disclosure, FIG. 2 is a sectional view taken along line I-I' shown in FIG. 1, and FIG. 3 is a schematic view illustrating a light path of FIG. 2.

Referring to FIGS. 1 to 3, the viewing angle limiting apparatus according to one embodiment of the present disclosure includes a first optical member 10, and a second optical member 20. The first optical member 10 according to one embodiment may include a plurality of lower light shielding members 131, and the second optical member 20 may include a plurality of upper light shielding members 231.

As the viewing angle limiting apparatus 1 according to one embodiment of the present disclosure is provided to be coupled (or disposed) toward a side to which an image is emitted from various display apparatuses such as a liquid crystal display apparatus, a light emitting display apparatus, an organic light emitting display apparatus, a micro light emitting display apparatus, and a quantum dot light emitting display apparatus, image light may be emitted from the display apparatus within a certain angle range, and light getting out of the certain angle range may be shielded, whereby a user's viewing angle for an image may be limited.

The lower light shielding members 131 and the upper light shielding members 231 according to one embodiment may be made of a light absorbing material to absorb a portion of external light such as image light, whereby the user's viewing angle for the image light may be limited. However, without limitation to this case, the lower light shielding members 131 and the upper light shielding members 231 may be made of another material if the user's viewing angle for the image light may be limited.

Referring to FIGS. 1 to 3, each of the plurality of upper light shielding members 231 may be spaced apart from each of the plurality of lower light shielding members 131 in a thickness direction of the first optical member 10, and may be disposed to be alternate with each of the plurality of lower light shielding members 131.

The thickness direction of the first optical member 10 may be a Y-axis direction based on FIG. 1. An X-axis direction may be a width direction of the first optical member 10 in a direction perpendicular to the Y-axis direction. The plurality of lower light shielding members 131 may be disposed to be spaced apart from one another in a width direction of the first optical member 10. The plurality of upper light shielding members 231 may be disposed to be spaced apart from one another in a width direction of the second optical member 20. A Z-axis direction may be a direction perpendicular to each of the X-axis direction and the Y-axis direction. The width direction of the first optical member 10 may be a first axis direction, and the thickness direction of the first optical member 10 may be a second axis direction.

Therefore, the lower light shielding members 131 may be disposed to be spaced apart from one another in the first axis direction (e.g., X-axis direction), and the upper light shielding members 231 may be disposed to be spaced apart from one another in the first axis direction (e.g., X-axis direction). The lower light shielding members 131 may be disposed to be spaced apart from the upper light shielding members 231 as much as a first interval G1 (shown in FIG. 3) in the second axis direction (e.g., Y-axis direction).

In the viewing angle limiting apparatus 1 according to one embodiment of the present disclosure, the reason why that the lower light shielding members 131 are disposed to be spaced apart from the upper light shielding members 231 in the second axis direction (e.g., Y-axis direction) is that each of the lower light shielding members 131 and each of the upper light shielding member 231 are provided at a first height H1 (shown in FIG. 2) (or first length) to more easily manufacture the light shielding member than the general case that one light shielding member is provided to be longer than the first height H1 in the second direction (e.g., Y-axis direction).

For example, in the general case, after a mold is imprinted with a die provided with a bite to form a pattern, the pattern is filled with a light absorbing material, whereby the light shielding member is manufactured. However, in some embodiments, a mold should be imprinted with a die with a deep bite to obtain a long light shielding member. In this process, the mold is attached to the die, whereby a problem occurs in that it is difficult to form the pattern for the reason that the pattern is broken.

On the other hand, in the viewing angle limiting apparatus 1 according to one embodiment of the present disclosure, the light shielding members are formed with a first height H1 shorter than the general light shielding member and then disposed to be spaced apart from one another up and down.

In this case, since the light shielding members do not need to be provided at a long length unlike the general case, the light shielding members may be manufactured more easily than the general case while lowering a defect rate.

Meanwhile, in the viewing angle limiting apparatus 1 according to one embodiment of the present disclosure, each of the upper light shielding members 231 is disposed to be alternate with each of the lower light shielding members 131. This is to allow the viewing angle limiting apparatus 1 according to one embodiment of the present disclosure to limit a portion of image light IL emitted from a display apparatus (not shown) disposed at a lower portion in the second axis direction (e.g., Y-axis direction).

As shown in FIG. 3, among image lights entering the viewing angle limiting apparatus from the first optical member 10 through a portion between the lower light shielding members 131, light provided with a light path formed at a side of the lower light shielding member 131 or a side of the upper light shielding member 231 is shielded by the lower light shielding member 131 or the upper light shielding member 231, and, for this reason, the light is not emitted to the outside through the second optical member 20.

On the other hand, among image lights entering the viewing angle limiting apparatus from the first optical member 10 through a portion between the lower light shielding members 131, light which is not provided with a light path formed at a side of the lower light shielding member 131 or a side of the upper light shielding member 231 may be emitted to the outside through the second optical member 20.

Therefore, among image lights, which are emitted from the display apparatus and then enter the viewing angle limiting apparatus 1 according to one embodiment of the present disclosure, a portion of image light IL entering the viewing angle limiting apparatus 1 at a first angle IAθ with respect to an upper surface 110a (shown in FIG. 2) of a first base film 110 of the first optical member 10 may be emitted to the outside without being shielded by the lower light shielding member 131 or the upper light shielding member 231.

At this time, the image light IL emitted from the second optical member 20 to the outside may be emitted at a second angle GAθ with respect to a reference line RL due to a difference in a refractive index between a second base film 210 of the second optical member 20 and the external air. In this case, the reference line RL may mean a front direction of the viewing angle limiting apparatus 1 according to one embodiment of the present disclosure, and may be a direction parallel with the second axis direction (e.g., Y-axis direction).

Consequently, in the viewing angle limiting apparatus 1 according to one embodiment of the present disclosure, each of the upper light shielding members 231 and each of the lower light shielding members 131, which have the first height H1, are disposed to be spaced apart from each other in the second axis direction (e.g., Y-axis direction) but disposed to be alternate with each other or disposed to cross each other in the first axis direction (e.g., X-axis direction), whereby a portion of the image light IL entering the viewing angle limiting apparatus 1 at the first angle IAθ may be emitted to the outside. As a result, a user's viewing angle for the image may be limited, and the light shielding members may easily be manufactured. In this case, the first angle IAθ may be about 74°, for example.

Hereinafter, elements of each of the first optical member 10 and the second optical member 20 of the viewing angle limiting apparatus 1 according to one embodiment of the present disclosure will be described in detail with reference to FIGS. 1 to 3.

The first optical member 10 according to one embodiment may have a first base film 110 and a first optical layer 130, wherein the first optical layer 130 may have a plurality of lower light shielding members 131, a first insertion groove 132, and a first optical pattern 133.

The second optical member 20 according to one embodiment may have a second base film 210 and a second optical layer 230, wherein the second optical layer 230 may have a plurality of upper light shielding members 231, a second insertion groove 232, and a second optical pattern 233.

The first base film 110 may be disposed at the lowest side in the viewing angle limiting apparatus 1 according to one embodiment of the present disclosure. As described above, since the viewing angle limiting apparatus 1 according to one embodiment of the present disclosure is coupled to the display apparatus, the first base film 110 may be a portion coupled to the display apparatus. The first base film 110 may be coupled to the display apparatus through a transparent adhesive.

The first optical layer 130, an intermediate layer 30, the second optical layer 230, and the second base film 210 may sequentially be disposed on the first base film 110 in the second direction (e.g., Y-axis direction). Therefore, the first base film 110 may be supported in the display apparatus to support the first optical layer 130, the intermediate layer 30, the second optical layer 230 and the second base film 210.

The first base film 110, as shown in FIG. 1, may be provided in a rectangular plate shape having a certain thickness, but is not limited thereto. The first base film 110 may be provided in another shape such as a circular shape and an elliptical shape in accordance with a shape of a portion to which light from the display apparatus is emitted, and its thickness may also be varied.

Since the first base film 110 should emit incident light from the display apparatus to the outside, the first base film 110 may be made of a transparent material. For example, the first base film 110 may be made of at least one of acrylic resin, PVC, PET, polyacrylate, polyurethane, polycarbonate, or polypropylene.

The first optical layer 130 may be disposed on the first base film 110. The first optical layer 130 may shield a portion of light incident through the first base film 110. The first optical layer 130 may include a lower light shielding member 131, a first insertion groove 132, and a first optical pattern 133.

The lower light shielding member 131 may shield light. The lower light shielding member 131 according to one embodiment may shield light by absorbing the light. The lower light shielding member 131 may include an opaque material such as a metal material, a metal oxide material, or a nitride material. In more detail, the lower light shielding member 131 may include any one selected from carbon, SiN, TiN, SiC, Ta, Ti, W, CuO, $Al_2O_3$, $Fe_3O_4$ and $Ta_2O_5$. Also, the lower light shielding member 131 may be made of an organic material having excellent light absorptivity.

The lower light shielding member 131 may be provided in a plural number, and the plurality of lower light shielding members 131 may be disposed to be spaced apart from one another between the first base film 110 and the second base film 210. For example, the lower light shielding members 131 may be disposed on the first base film 110 at a certain interval along the first axis direction (e.g., X-axis direction).

The first axis direction (e.g., X-axis direction) according to one embodiment may be a direction where the viewing angle limiting apparatus 1 according to one embodiment of the present disclosure shields a portion of light emitted from the display apparatus. Therefore, as shown in FIG. 3, the image light IL incident to be inclined without being shielded by the lower light shielding members 131 may be emitted to the outside by passing through the viewing angle limiting apparatus 1 according to one embodiment of the present disclosure, and the image light shielded by the lower light shielding members 131 cannot be emitted to the outside. Therefore, the viewing angle limiting apparatus 1 according to one embodiment of the present disclosure may limit the viewing angle in the first axis direction (e.g., X-axis direction).

For example, the viewing angle limiting apparatus 1 according to one embodiment of the present disclosure may be provided in a dashboard of a vehicle to limit image light emitted from the dashboard of the vehicle to be emitted toward a driver without being emitted to a wind shield. When an image of the dashboard of the vehicle is emitted to the wind shield, a so-called window reflection may occur, whereby the driver's view may be disturbed. In this case, the first axis direction (e.g., X-axis direction) may be a direction where the driver and the wind shield are positioned, wherein a side where the driver is positioned may be a lower side direction (arrow direction D), and a side where the wind shield is positioned may be an upper side direction (arrow direction U).

As described above, a portion of the image light IL entering the viewing angle limiting apparatus at the first angle IAθ, that is, 74° with respect to the upper surface 110a (shown in FIG. 2) of the first base film 110 may be emitted to the outside without being shielded by the lower light shielding member 131 or the upper light shielding member 231, whereby the portion of the image light IL may reach the driver positioned in the lower side direction (arrow direction D).

Therefore, the viewing angle limiting apparatus 1 according to one embodiment of the present disclosure is disposed between the driver and the wind shield to limit the image light emitted toward the wind shield, whereby the driver's view may be prevented from being disturbed due to window reflection.

The first angle IAθ is about 74° as described above, but is not limited thereto. The first angle IAθ may be varied depending on a viewing angle required by a user.

Referring to FIG. 2 again, the lower light shielding members 131 may be disposed to be spaced apart from one another at a first pitch P1 along the first axis direction (e.g., X-axis direction). This is because that light may enter a portion between the respective lower light shielding members 131 when the lower light shielding portions 131 are disposed to be spaced apart from one another.

The first pitch P1 may be varied depending on the first height H1 of each of the lower light shielding members 131. As described above, when the viewing angle required by the user, that is, the first angle IAθ is about 74°, a ratio of the first height H1 to the first pitch P1 may be about 1:1.5. Therefore, when the first height H1 is high, the first pitch P1 may be increased, and when the first height H1 is low, the first pitch P1 may be reduced.

For example, in the viewing angle limiting apparatus 1 according to one embodiment of the present disclosure, the first height H1 of the lower light shielding member 131 may be provided to be 50 μm or more and 75 μm or less. When the first height H1 of the lower light shielding member 131 is less than 50 μm, the first height H1 is too low, whereby light shielding effect may be reduced. When the first height H1 of the lower light shielding member 131 exceeds 75 µm, the first height H1 is too high, whereby a manufacturing process may be difficult. Therefore, in the viewing angle limiting apparatus 1 according to one embodiment of the present disclosure, the first height H1 of the lower light shielding member 131 is provided to be 50 µm or more and 75 µm or less, whereby the light shielding member may easily be manufactured without deterioration of a light shielding effect.

Meanwhile, in the viewing angle limiting apparatus 1 according to one embodiment of the present disclosure, a width W1 of each of the lower light shielding members 131 may be provided to be 500 nm or more and 1000 nm or less. When the width W1 of the lower light shielding member 131 is less than 500 nm, a light shielding effect of the lower light shielding member 131 for the image light may be reduced, and when the width W1 of the lower light shielding member 131 exceeds 1000 nm, an aperture ratio may be reduced, whereby luminance of the image light may be lowered. Therefore, in the viewing angle limiting apparatus 1 according to one embodiment of the present disclosure, the width W1 of each of the lower light shielding members 131 may be provided to be 500 nm or more and 1000 nm or less, whereby an aperture ratio may be prevented from being reduced, and a light shielding effect may be prevented from being deteriorated.

In the viewing angle limiting apparatus 1 according to one embodiment of the present disclosure, the lower light shielding members 131 may be formed through a partial deposition process after a mold is imprinted with a die frame provided with a bite to form a pattern. That is, a general light shielding member is formed by filling an imprinting pattern with a material constituting the light shielding member, whereas the lower light shielding member 131 of the viewing angle limiting apparatus 1 according to one embodiment of the present disclosure may be formed through a partial deposition process for an imprinting pattern to obtain a width thinner than that of the general light shielding member.

Also, in the viewing angle limiting apparatus 1 according to one embodiment of the present disclosure, after the first optical member 10 is manufactured by the above process, the manufactured first optical member 10 is cut to obtain a plurality of first optical members, and then two of the first optical members 10 are bonded to each other by two adhesives, whereby the viewing angle limiting apparatus 1 according to one embodiment of the present disclosure may be manufactured. In this case, the first optical pattern 133 of each of the two first optical members 10 may be in contact with the adhesive. Therefore, in the viewing angle limiting apparatus 1 according to one embodiment of the present disclosure, since the first optical member 10 and the second optical member 20 are not required to be manufactured separately, the viewing angle limiting apparatus 1 according to one embodiment of the present disclosure may be manufactured more simply.

Referring to FIG. 2 again, the plurality of first insertion grooves 132 may be disposed to be spaced apart from one another in the first optical pattern 133 in the first axis direction (e.g., X-axis direction). As described above, the lower light shielding member 131 may be formed through a partial deposition process for grooves after patterns and the grooves are formed by imprinting a mold with a die frame provided with a bite. In this case, a portion of the grooves formed by the bite may be the first insertion groove 132. The pattern may be the first optical pattern 133. Therefore, the plurality of first insertion grooves 132 may be formed to be spaced apart from one another in the first optical pattern 133.

The material constituting the lower light shielding member 131 is sprayed toward the groove in a direction from an upper side to one side of the groove and then partially deposited on one side of the first optical pattern 133, whereby each of the lower light shielding members 131 may be formed to be disposed on one side of the groove.

Afterwards, an empty space of the groove in which the lower light shielding member 131 is disposed is filled with the material constituting the first optical pattern 133, whereby the lower light shielding member 131 disposed in the first insertion groove 132 may finally be formed. At this time, the material constituting the first optical pattern 133 may be doped to cover an upper surface of the lower light shielding member 131. As a result, the lower light shielding members 131 may be disposed to be spaced apart from one another in the first optical pattern 133 in the first axis direction (e.g., X-axis direction).

Meanwhile, since each of the lower light shielding members 131 is disposed in each of the first insertion grooves 132, the width W1 of each of the lower light shielding members 131 may be the width of each of the first insertion grooves 132. As described above, since the width W1 of each of the lower light shielding members 131 is provided to be 500 nm or more and 1000 nm or less, the width of each of the first insertion grooves 132 may be provided to be 500 nm or more and 1000 nm or less.

The first optical pattern 133 may be a frame that may form an overall shape of the first optical layer 130. The first optical pattern 133 may be provided to surround the lower light shielding members 131 while spacing the lower light shielding members 131 apart from the intermediate layer 30. In more detail, the first optical pattern 133 may be formed to be in contact with an upper surface and sides of the lower light shielding member 131, thereby preventing the lower light shielding member 131 from being exposed to the outside and preventing the shape of the lower light shielding member 131 from being deformed.

The first optical pattern 133 according to one embodiment should emit incident light from the display apparatus to the outside and therefore may be made of a transparent material. For example, the first optical pattern 133 may be made of at least one of materials such as acrylic resin, PVC, PET, polyacrylate, polyurethane, polycarbonate and polypropylene.

Referring to FIG. 2, the intermediate layer 30 may be disposed between the first optical layer 130 and the second optical layer 230. The intermediate layer 30 may couple the first optical layer 130 with the second optical layer 230. The intermediate layer 30 may be coupled with an upper surface of the first optical layer 130 and an upper surface of the second optical layer 230, thereby coupling the first optical layer 130 with the second optical layer 230.

In this case, the upper surface of the first optical layer 130 may mean one surface positioned at an upper side in the first optical pattern 133 based on FIG. 2, and the upper surface of the second optical layer 230 may be one surface of the second optical pattern 233 disposed to face one surface of the first optical pattern 133. Therefore, the upper surface of the lower light shielding member 131 and the upper surface of the upper light shielding member 231 may be dispose to face each other based on the intermediate layer 30.

The intermediate layer 30 according to one embodiment may be, but not limited to, OCA. The intermediate layer 30 may be made of another material if it may couple the first optical layer 130 with the second optical layer 230. The intermediate layer 30 may be made of a transparent material to emit incident light, which has passed through the first base film 110 and the first optical layer 130, to the outside.

The intermediate layer 30 according to one embodiment may be provided to have a thickness of 10 µm or more and 100 µm or less. When the thickness of the intermediate layer 30 is less than 10 µm, a cohesion for coupling the first optical layer 130 with the second optical layer 230 may be weakened, and when the thickness of the intermediate layer 30 exceeds 100 µm, the first optical layer 130 and the second optical layer 230 may be too much spaced apart from each other, whereby a shielding effect of image light may be lowered. In the viewing angle limiting apparatus 1 according to one embodiment of the present disclosure, the thickness of the intermediate layer 30 is provided to be 10 µm or more and 100 µm or less, whereby the first optical layer 130 and the second optical layer 230 may rigidly be coupled with each other and the light shielding effect may be prevented from being deteriorated.

Referring to FIG. 2, the second optical layer 230 and the second base film 210 of the second optical member 20 may sequentially be disposed on the intermediate layer 30.

In the viewing angle limiting apparatus 1 according to one embodiment of the present disclosure, the second optical member 20 may be manufactured by the same method as the method of manufacturing the first optical member 10. Therefore, each of the plurality of upper light shielding members 231, the second insertion groove 232 and the second optical pattern 233, which are included in the second optical pattern 230, may be provided in the same manner as each of the plurality of lower light shielding members 131, the first insertion groove 132 and the first optical pattern 133, which are included in the first optical layer 130, in shapes and functions.

However, each of the plurality of upper shielding members 231 may be disposed to be alternate with each of the plurality of lower shielding members 131. That is, the respective lower light shielding members 131 may be disposed between the respective upper light shielding members 231.

The upper light shielding member 231 may shield light. The upper light shielding member 231 according to one embodiment may shield light by absorbing the light. The upper light shielding member 231 may include an opaque material such as a metal material, a metal oxide material, or a nitride material. In more detail, the upper light shielding member 231 may include any one selected from carbon, SiN, TiN, SiC, Ta, Ti, W, CuO, $Al_2O_3$, $Fe_3O_4$ and $Ta_2O_5$. Also, the upper light shielding member 231 may be made of an organic material having excellent light absorptivity.

The upper light shielding member 231 may be provided in a plural number, and the plurality of upper light shielding members 231 may be disposed to be spaced apart from one another between the first base film 110 and the second base film 210. The upper light shielding members 231 may be disposed on the second base film 210 at a certain interval along the first axis direction (e.g., X-axis direction). In this case, an upper surface of the second base film 210 may be a surface facing the upper surface 110a of the first base film 110 based on FIG. 2. Therefore, the upper light shielding members 231 may be disposed to be spaced apart from one another between the intermediate layer 30 and the second base film 210.

As shown in FIG. 2, since the upper light shielding member 231 is disposed above the lower light shielding member 131 in the second axis direction (e.g., Y-axis direction), the upper light shielding member 231 may shield (or absorb) a portion of the image light IL emitted without being shielded (or absorbed) by the lower light shielding member 131.

Therefore, as shown in FIG. 3, the image light IL which is not shielded by the upper light shielding members 231 may be emitted to the outside by passing through the viewing angle limiting apparatus 1 according to one embodiment of the present disclosure, and the image light shielded by the upper light shielding members 231 cannot be emitted to the outside. Therefore, as described above by way of example, the viewing angle limiting apparatus 1 according to one embodiment of the present disclosure may be provided such that a portion of the image light IL entering the viewing angle limiting apparatus at about 74° with respect to the upper surface 110a of the first base film 110 may be emitted to the outside without being shielded by the lower light shielding member 131 and the upper light shielding member 231, whereby the portion of the image light IL may reach a driver positioned in the first axis direction (e.g., X-axis direction).

Consequently, the viewing angle limiting apparatus 1 according to one embodiment of the present disclosure is disposed between the driver and a wind shield to partially limit the image light emitted toward the wind shield, whereby the driver's view may be prevented from being disturbed due to window reflection.

Referring to FIG. 2 again, the upper light shielding members 231 may be disposed to be spaced apart from one another at a second pitch P2 along the first axis direction (e.g., X-axis direction). This is because that image lights which are not shielded by the lower light shielding members 131 may enter the second optical layer 230 when the upper light shielding members 231 are disposed to be spaced apart from one another. The second pitch P2 may be provided to be equal to the first pitch P1, but is not limited thereto.

The second pitch P2 may be varied depending on a second height H2 of each of the upper light shielding members 231. As described above, since the second optical layer 230 is manufactured by the same process as a manufacturing process of the first optical layer 130, a ratio of the second height H2 to the second pitch P2 may be 1:1.5. Therefore, when the second height H2 is high, the second pitch P2 may be increased, and when the second height H2 is low, the second pitch P2 may be reduced. The second height H2 of the upper light shielding member 231 may be provided to be 50 µm or more and 75 µm or less, whereby the light shielding member may easily be manufactured without deterioration of a light shielding effect.

A width W2 of each of the upper light shielding members 231 may be provided to be 500 nm or more and 1000 nm or less. When the width W2 of the upper light shielding member 231 is less than 500 nm, a light shielding effect of the upper light shielding member 231 for the image light may be reduced, and when the width W2 of the upper light shielding member 231 exceeds 1000 nm, an aperture ratio may be reduced, whereby luminance of the image light may be lowered. Therefore, in the viewing angle limiting apparatus 1 according to one embodiment of the present disclosure, the width W2 of the upper light shielding member 231 may be provided to be 500 nm or more and 1000 nm or less, whereby an aperture ratio may be prevented from being reduced, and a light shielding effect may be prevented from being deteriorated.

In the viewing angle limiting apparatus 1 according to one embodiment of the present disclosure, since the upper light shielding members 231 are manufactured by an imprinting method, a partial deposition, and a doping process in the same manner as the manufacturing method of the lower light shielding member 131, the upper light shielding members 231 may be formed to be thinner than a width of the general light shielding member.

In more detail, the upper light shielding members 231 may be formed by being partially deposited on one side of a pattern to be positioned in grooves after the pattern and the grooves are formed by imprinting a mold with a die frame provided with a bite. In this case, some of the grooves formed by the bite may be the second insertion grooves 232. The pattern may be the second optical pattern 233. Therefore, the plurality of second insertion grooves 232 may be formed to be spaced apart from one another in the second optical pattern 233.

Then, the material constituting the upper light shielding member 231 is sprayed toward the groove in a direction from an upper side to one side of the groove and then partially deposited on one side of the second optical pattern 233, whereby each of the upper light shielding members 231 may be formed to be disposed on one side of the groove. Afterwards, an empty space of the groove in which the upper light shielding member 231 is disposed is filled with the material constituting the second optical pattern 233, whereby the upper light shielding member 231 disposed in the second insertion groove 232 may finally be formed. At this time, the material constituting the second optical pattern 233 may be doped to cover an upper surface of the upper light shielding member 231. As a result, the upper light shielding members 231 may be disposed to be spaced apart from one another in the second optical pattern 233 in the first axis direction (e.g., X-axis direction).

Meanwhile, since each of the upper light shielding members 231 is disposed in each of the second insertion grooves 232, the width W2 of each of the upper light shielding members 231 may be the width of each of the second insertion grooves 232. As described above, since the width W2 of each of the upper light shielding members 231 is provided to be 500 nm or more and 1000 nm or less, the width of each of the second insertion grooves 232 may be provided to be 500 nm or more and 1000 nm or less.

The second optical pattern 233 may be a frame that may form an overall shape of the second optical layer 230. The second optical pattern 233 may be provided to surround the upper light shielding members 231 while spacing the upper light shielding members 231 apart from the intermediate layer 30. In more detail, the second optical pattern 233 may be formed to be in contact with an upper surface and sides of the upper light shielding member 231, thereby preventing the upper light shielding member 231 from being exposed to the outside and preventing the shape of the upper light shielding member 231 from being deformed.

The second optical pattern 233 according to one embodiment should emit incident light from the display apparatus to the outside and therefore may be made of a transparent material. For example, the second optical pattern 233 may be made of at least one of materials such as acrylic resin, PVC, PET, polyacrylate, polyurethane, polycarbonate and polypropylene.

The second base film 210 may be disposed at the uppermost side in the viewing angle limiting apparatus 1 according to one embodiment of the present disclosure. As described above, since the viewing angle limiting apparatus 1 according to one embodiment of the present disclosure is coupled to the display apparatus, the second base film 210 may be a portion to which the image light IL is finally emitted. In this case, an upper surface 210a of the second base film 210 may face an upper surface 110a of the first base film 110.

The second base film 210, as shown in FIG. 1, may be provided in a rectangular plate shape having a certain thickness, but is not limited thereto. The second base film 210 may be provided in another shape such as a circular shape and an elliptical shape in accordance with a shape of a portion to which light from the display apparatus is emitted, and its thickness may also be varied.

In some embodiments, since the second base film 210 should emit incident light from the display apparatus to the outside, the second base film 210 may be made of a transparent material. For example, the second base film 210 may be made of at least one of acrylic resin, PVC, PET, polyacrylate, polyurethane, polycarbonate, or polypropylene.

Since the second base film 210 is in contact with the outside, that is, the air, a difference in a refractive index may occur. For example, since a refractive index of the second base film 210 may be 1.4, which is greater than a refractive index 1 of the air, the image light IL emitted from the second base film 210 may be emitted by being refracted at a second angle GAθ at a boundary portion between the second base film 210 and the air. The second angle GAθ may be an emission angle of the image light IL for the reference line RL. For example, the second angle GAθ may be about 30° or less.

In conclusion, in the viewing angle limiting apparatus 1 according to one embodiment of the present disclosure, the upper light shielding members 231 and the lower light shielding members 131, each of which has a height lower than that of the general light shielding member, are disposed to be spaced apart from each other in the second axis direction (e.g., Y-axis direction) but disposed to be alternate with or cross each other in the first axis direction (e.g., X-axis direction), whereby a portion of the image light IL entering the viewing angle limiting apparatus at the first angle IAθ may be emitted to the outside. As a result, the user's viewing angle for the image may be limited, and the viewing angle limiting apparatus 1 may be manufactured easily.

Figure 4A:
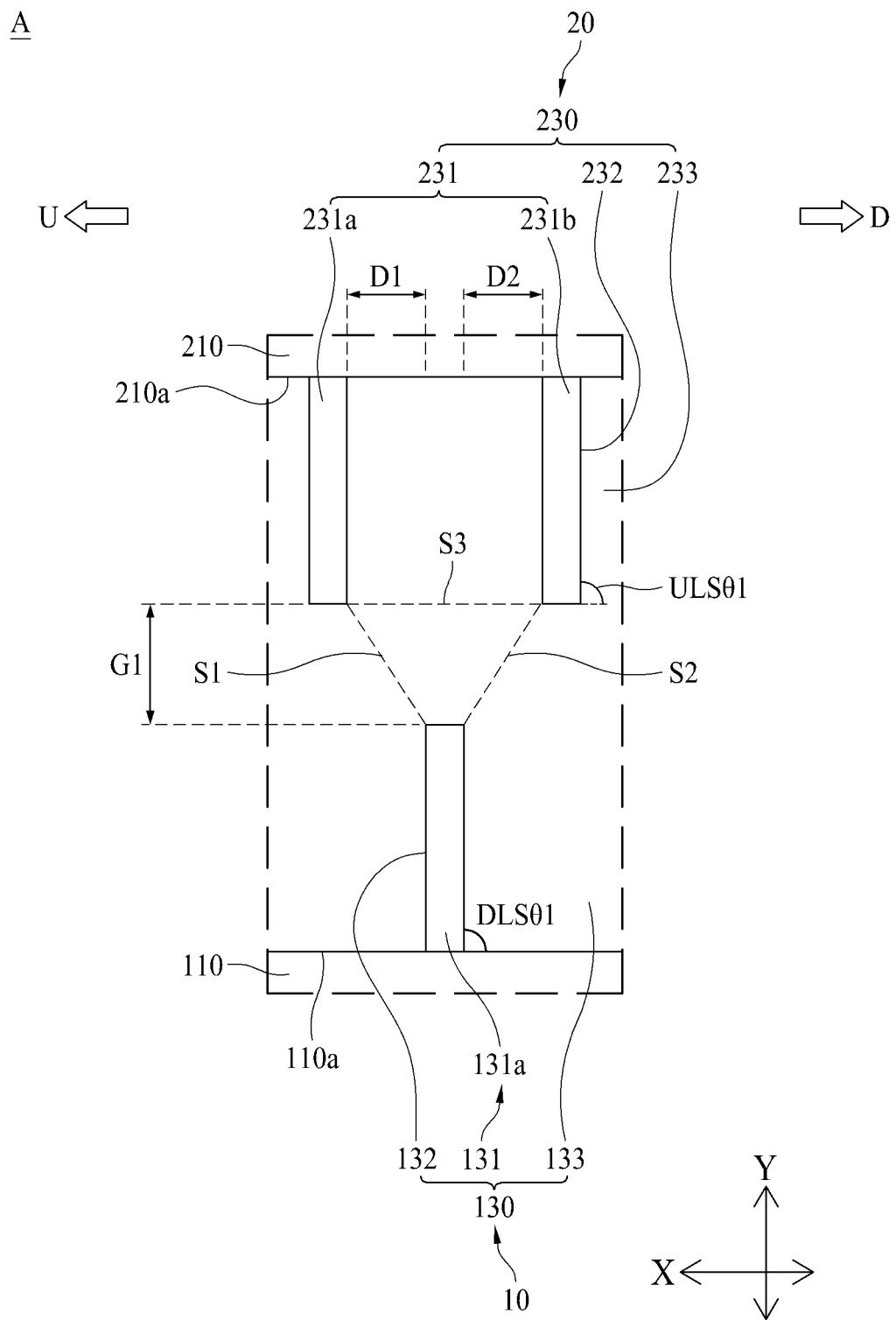
FIG. 4A is a schematic view illustrating a portion A of FIG. 2 to describe a first embodiment related to an arrangement position of a lower light shielding member and an upper light shielding member.
Figure 4B:
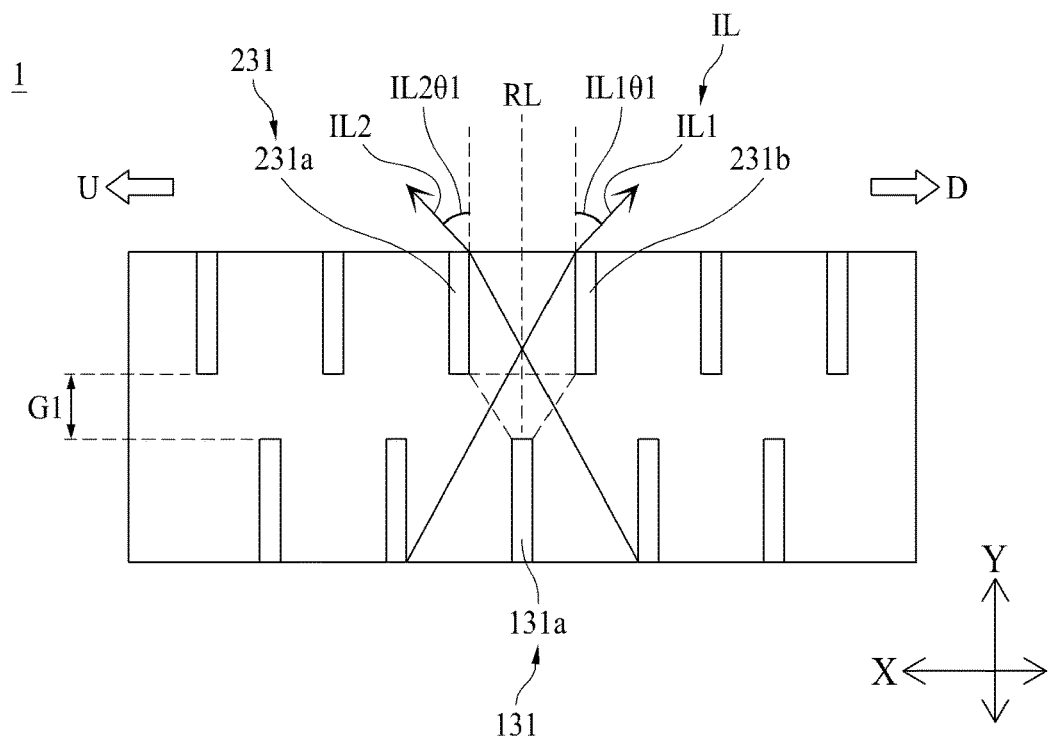
FIG. 4B is a schematic view illustrating a light path of FIG. 4A.
Figure 4C:
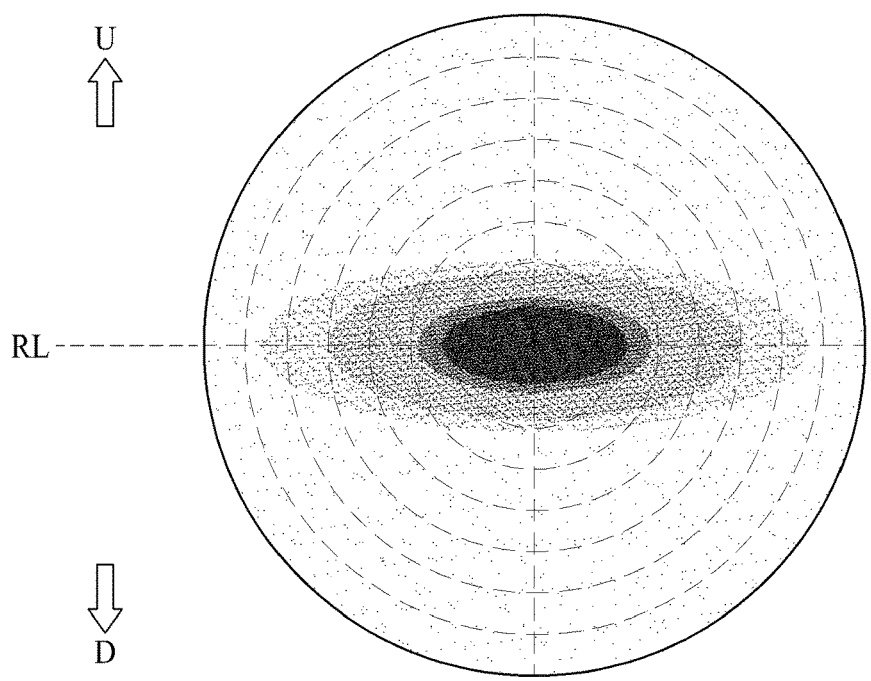
FIG. 4C is a schematic view illustrating a light profile of FIG. 4A.
Figure 5A:
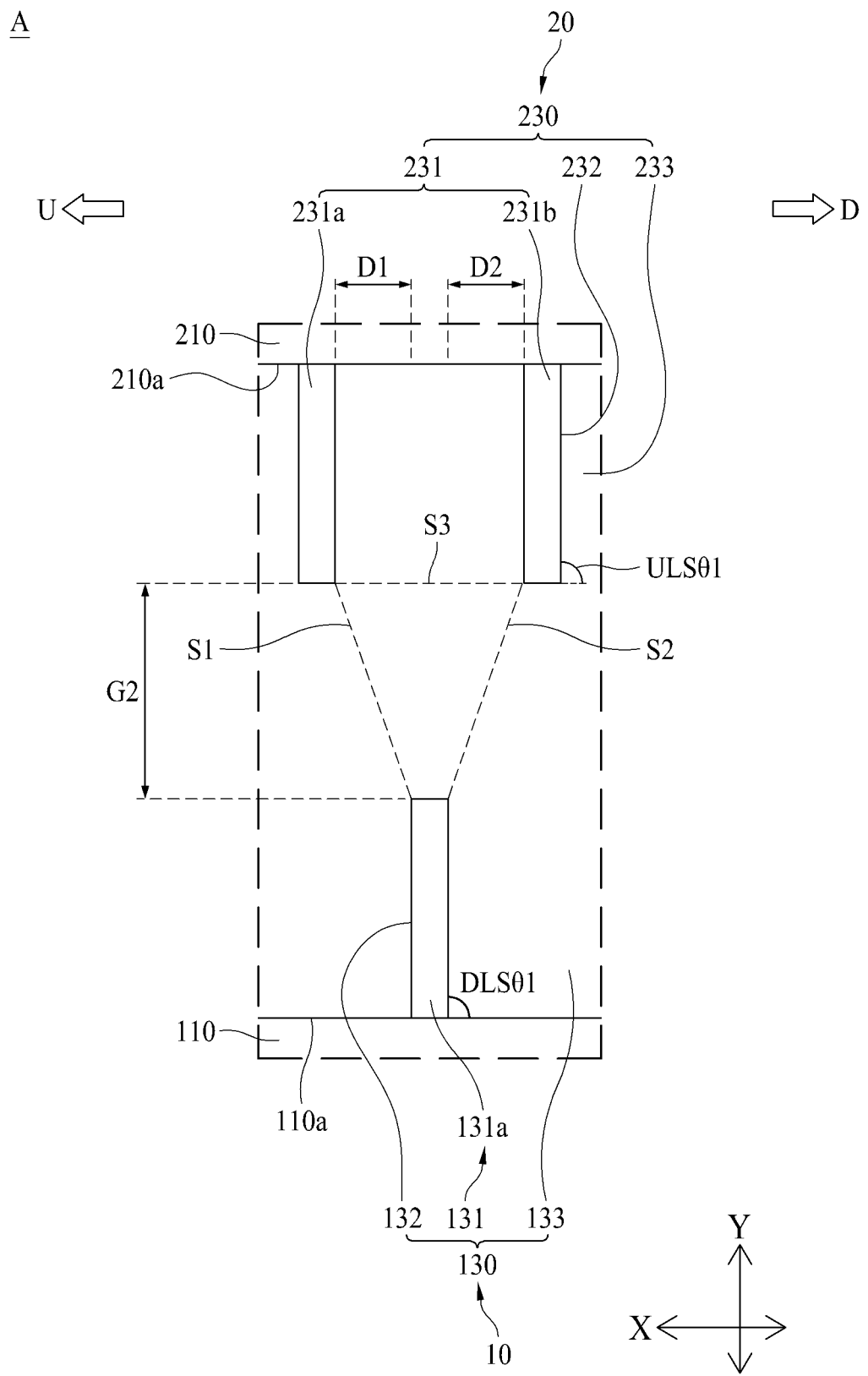
FIG. 5A is a schematic view illustrating a portion A of FIG. 2 to describe a second embodiment related to an arrangement position of a lower light shielding member and an upper light shielding member.
Figure 5B:
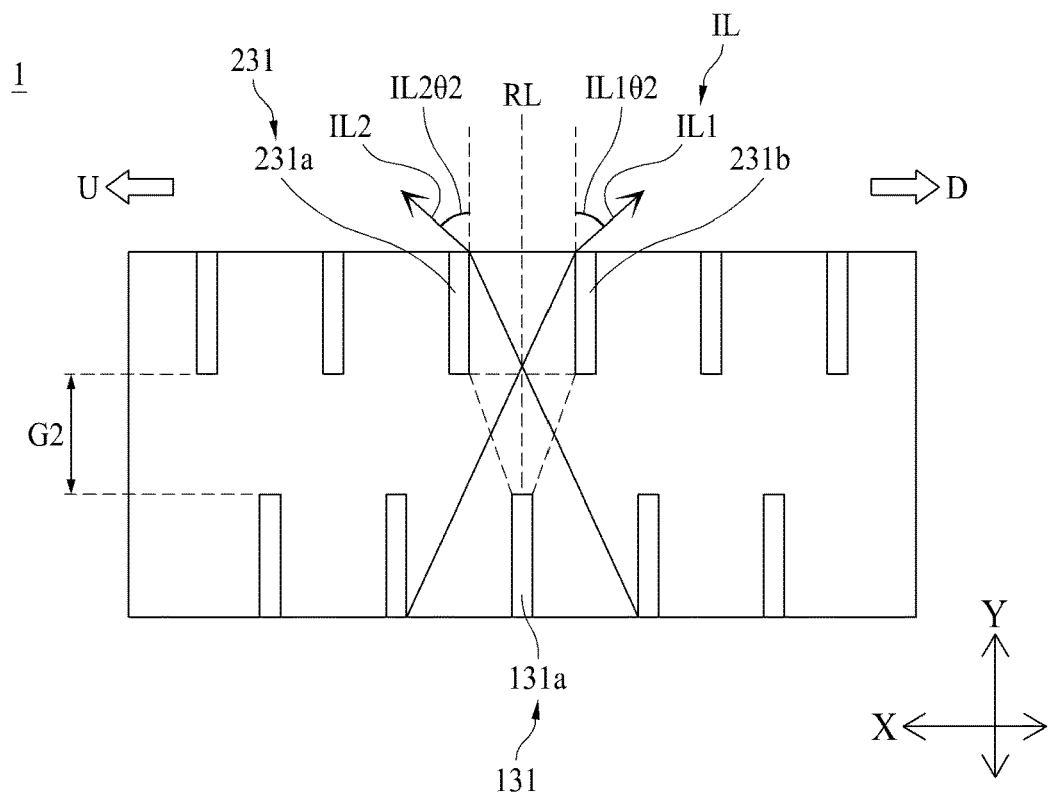
FIG. 5B is a schematic view illustrating a light path of FIG. 5A.
Figure 5C:
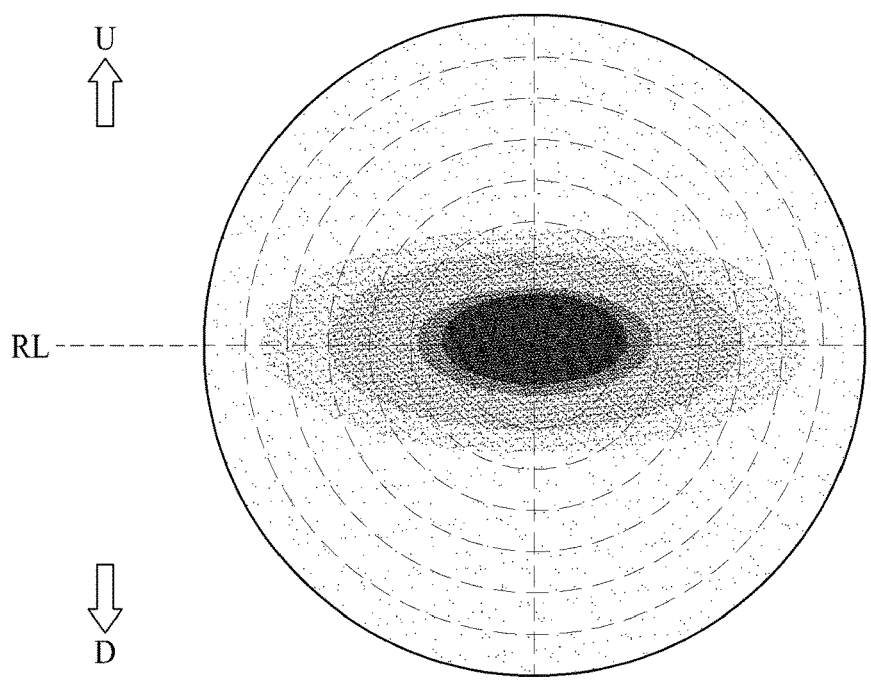
FIG. 5C is a schematic view illustrating a light profile of FIG. 5A.
Figure 6A:
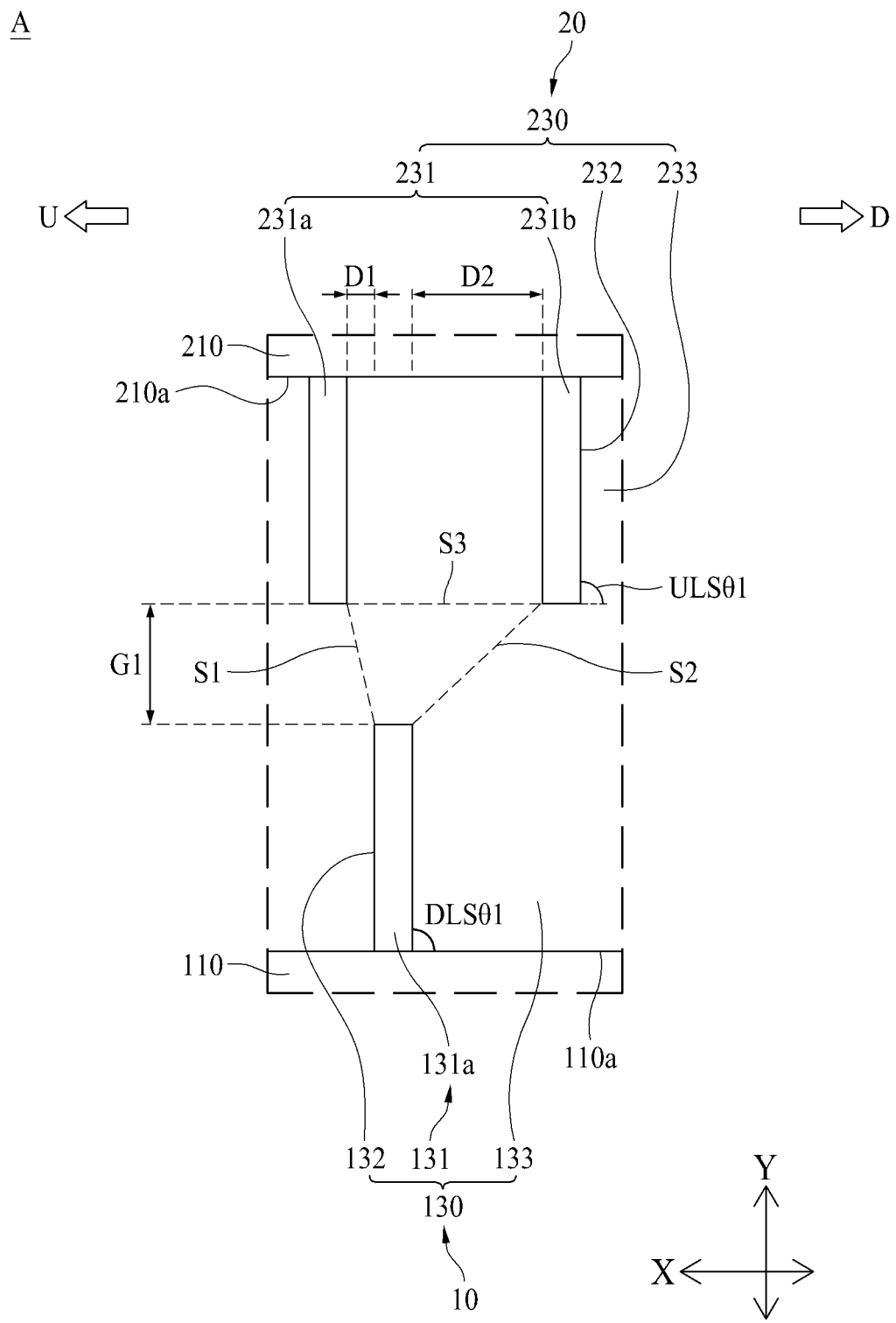
FIG. 6A is a schematic view illustrating a portion A of FIG. 2 to describe a third embodiment related to an arrangement position of a lower light shielding member and an upper light shielding member.
Figure 6B:
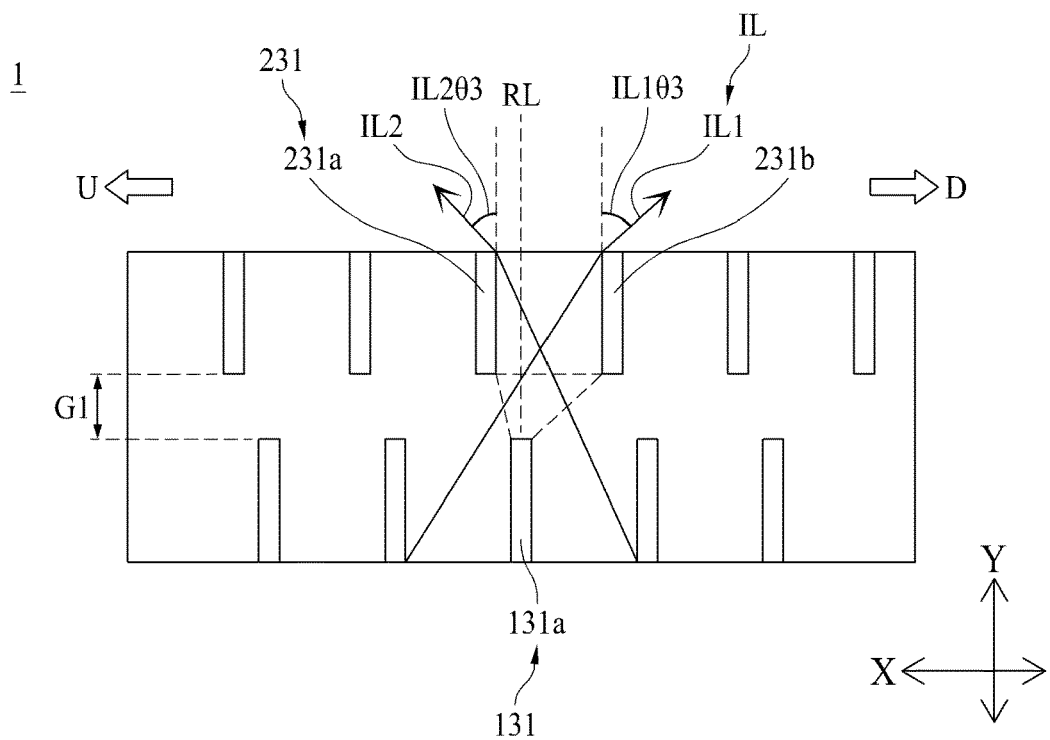
FIG. 6B is a schematic view illustrating a light path of FIG. 6A.
Figure 6C:
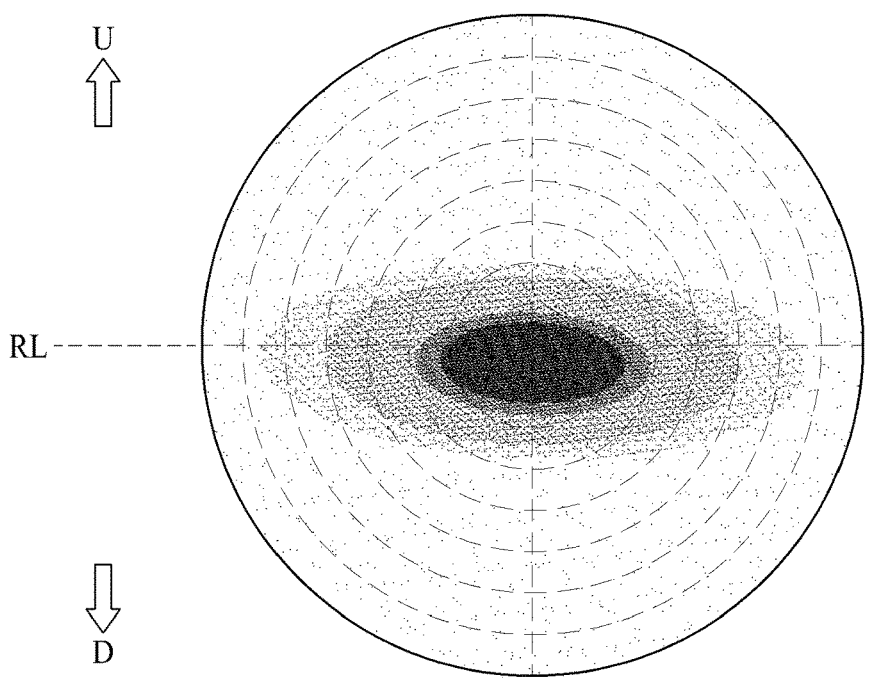
FIG. 6C is a schematic view illustrating a light profile of FIG. 6A.
Figure 7A:
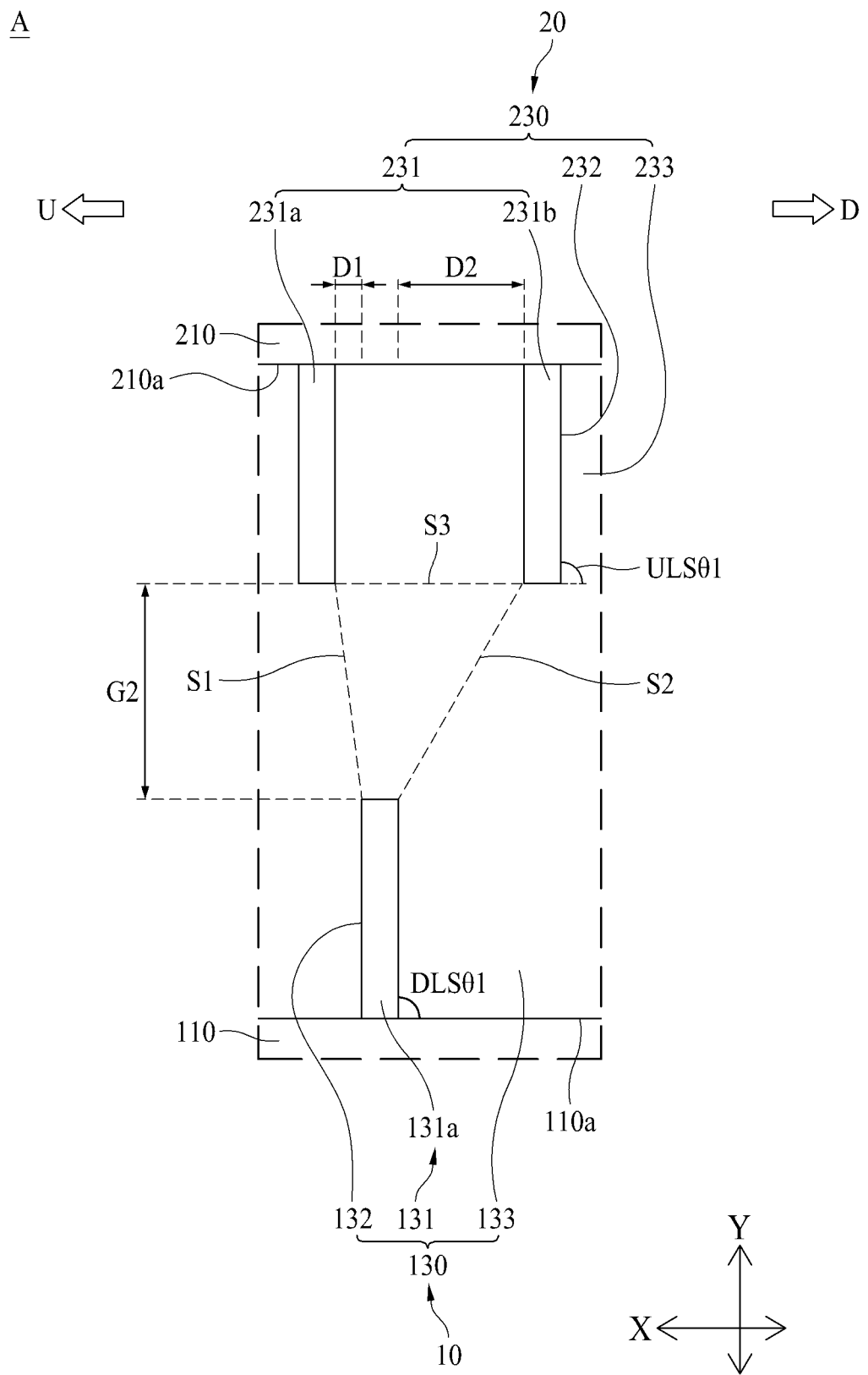
FIG. 7A is a schematic view illustrating a portion A of FIG. 2 to describe a fourth embodiment related to an arrangement position of a lower light shielding member and an upper light shielding member.
Figure 7B:
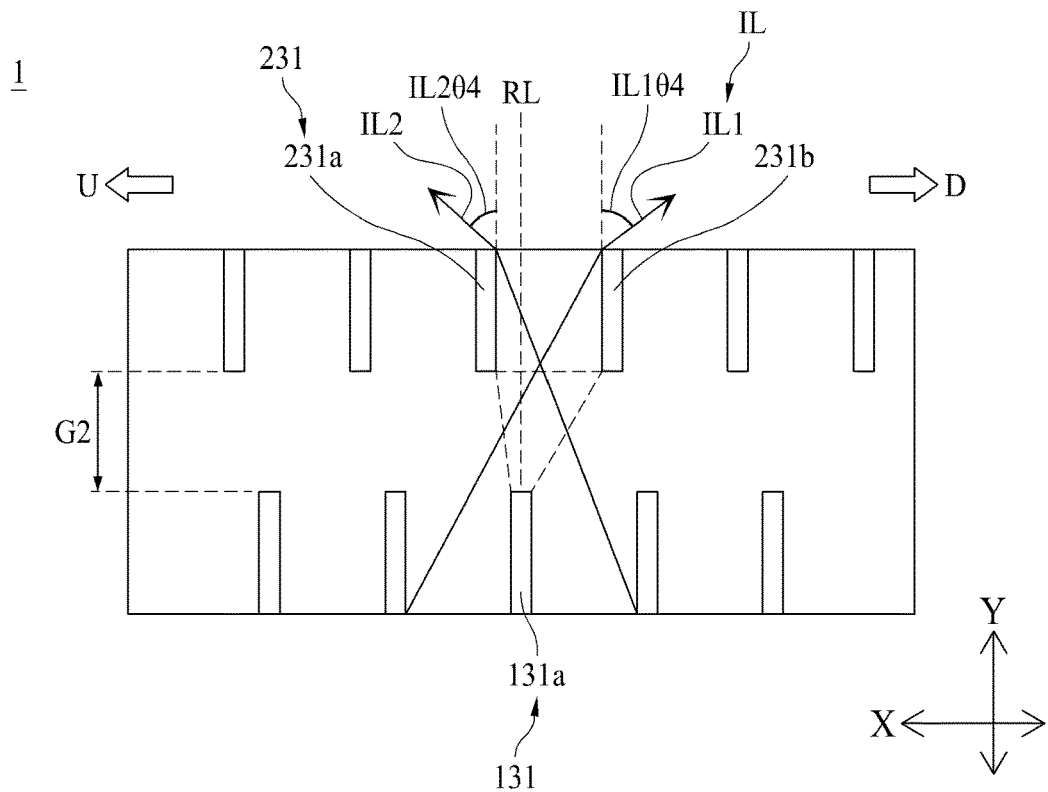
FIG. 7B is a schematic view illustrating a light path of FIG. 7A.
Figure 7C:
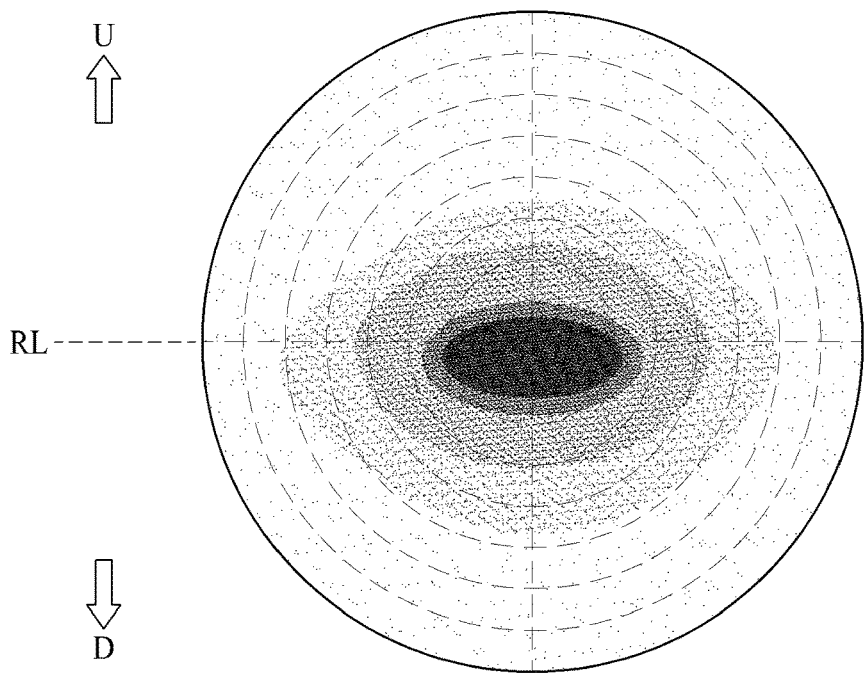
FIG. 7C is a schematic view illustrating a light profile of FIG. 7A.

FIG. 4A is a schematic view illustrating a portion A of FIG. 2 to describe a first embodiment related to an arrangement position of a lower light shielding member and an upper light shielding member, FIG. 4B is a schematic view illustrating a light path of FIG. 4A, FIG. 4C is a schematic view illustrating a light profile of FIG. 4A, FIG. 5A is a schematic partial view to describe a second embodiment related to an arrangement position of a lower light shielding member and an upper light shielding member, FIG. 5B is a schematic view illustrating a light path of FIG. 5A, FIG. 5C is a schematic view illustrating a light profile of FIG. 5A, FIG. 6A is a schematic partial view to describe a third embodiment related to an arrangement position of a lower light shielding member and an upper light shielding member, FIG. 6B is a schematic view illustrating a light path of FIG. 6A, FIG. 6C is a schematic view illustrating a light profile of FIG. 6A, FIG. 7A is a schematic partial view to describe a fourth embodiment related to an arrangement position of a lower light shielding member and an upper light shielding member, FIG. 7B is a schematic view illustrating a light path of FIG. 7A, and FIG. 7C is a schematic view illustrating a light profile of FIG. 7A.

Referring to FIGS. 4A to 7B, the viewing angle limiting apparatus 1 according to one embodiment of the present disclosure may be manufactured such that the plurality of lower light shielding members 131 and the plurality of upper light shielding members 231 may be disposed to be spaced apart from each other to be alternate with (or cross) each other in the second axis direction (e.g., Y-axis direction) in various ways in accordance with a user's request, whereby window reflection and the user's viewing angle for an image may be changed.

First of all, referring to FIG. 4A, the plurality of lower light shielding members 131 may include a first lower light shielding member 131a. The first lower light shielding member 131a may be one of the plurality of lower light shielding members 131 disposed on the first base film 110.

The plurality of upper light shielding members 231 may include a first upper light shielding member 231a and a second upper light shielding member 231b. The first upper light shielding member 231a and the second upper light shielding member 231b may be two upper light shielding members 231 disposed to be adjacent to each other among the plurality of upper light shielding members 231 disposed on the second base film 210.

The first lower light shielding member 131a may be disposed at a first angle DLSθ1 with respect to the upper surface 110a of the first base film 110, and each of the first upper light shielding member 231a and the second upper light shielding member 231b may be disposed at a second angle ULSθ1 with respect to the upper surface 110a of the first base film 110. As shown in FIG. 4A, each of the first angle DLSθ1 and the second angle ULSθ1 may be 90°. Therefore, the first lower light shielding member 131a, the first upper light shielding member 231a and the second upper light shielding member 231b may be disposed in a direction perpendicular to the upper surface 110a of the first base film 110, wherein this direction is parallel with the second axis direction (e.g., Y-axis direction).

The first lower light shielding member 131a, as shown in FIG. 4A, may be disposed between the first upper light shielding member 231a and the second upper light shielding member 231b. Therefore, the viewing angle limiting apparatus 1 according to one embodiment of the present disclosure may include a first side S1 for connecting one end of the first lower light shielding member 131a with one end of the first upper light shielding member 231a, a second side S2 for connecting one end of the first lower light shielding member 131a with one end of the second upper light shielding member 231b, and a third side S3 for connecting the first side S1 with the second side S2. In this case, the first side S1, the second side S2 and the third side S3 are sides virtually set for setting of a light profile.

FIGS. 4A to 4C are the first embodiment related to the arrangement position of the lower light shielding member 131 and the upper light shielding member 231, wherein a length of the first side S1 is equal to that of the second side S2 and is shorter than or equal to that of the third side S3.

Meanwhile, in FIG. 4A, the case that one end of the first lower light shielding member 131a and one end of the first upper light shielding member 231a are spaced apart from each other at a first interval G1 will be described by way of example. The first interval G1 may be a length a little longer than the thickness of the intermediate layer 30. In this case, one end of the first lower light shielding member 131a may be an end at one side of the first lower light shielding layer 131a disposed to be closest to the intermediate layer 30. One end of the first upper light shielding member 231a may be an end at the other side of the first upper light shielding layer 231a closest to the intermediate layer 30.

As described above, the first side S1 and the second side S2 may be provided to have the same length, whereby the first lower light shielding member 131a may be disposed at the center between the first upper light shielding member 231a and the second upper light shielding member 231b. Therefore, a first distance D1 (shown in FIG. 4A) of the first lower light shielding member 131 spaced apart from the first upper light shielding member 231a may be equal to a second distance D2 (shown in FIG. 4A) of the first lower light shielding member 131a spaced apart from the second upper light shielding member 231b.

Therefore, as shown in FIG. 4B, among image lights IL incident from a left side of the first lower light shielding member 131a, a first image light IL1 which is not shielded by the first lower shielding member 131a and the second upper light shielding member 231b may be emitted to the outside through the upper side of the second upper light shielding member 231b. Although not shown, the second base film 210 is disposed at the upper side of the second upper light shielding member 231b, and the first image light IL1 may be emitted by being refracted at a first emission angle IL1θ1 with respect to the reference line RL due to a difference in a refractive index between the second base film 210 and the external air. Consequently, among the image lights IL incident from the left side of the first lower light shielding member 131a, the first image light IL1 may be emitted by being refracted in a lower side direction (arrow direction D) from the first axis direction (e.g., X-axis direction).

On the other hand, among the image lights IL incident from the right side of the first lower light shielding member 131a, a second image light IL2 which is not shielded by the first lower light shielding member 131a and the first upper light shielding member 231a may be emitted to the outside through the upper side of the first upper light shielding member 231a. As described above, the second image light IL2 may be emitted by being refracted at a second emission angle IL2θ1 with respect to the reference line RL due to a difference in a refractive index between the second base film 210 disposed at the upper side of the first upper light shielding member 231a and the externa air. Consequently, among the image lights IL incident from the right side of the first lower light shielding member 131a, the second image light IL2 may be emitted by being refracted in an upper side direction (arrow direction U) from the first axis direction (e.g., X-axis direction).

In conclusion, among the image lights IL incident from each of the left and right sides of the first lower light shielding member 131a, the first image light IL1 and the second image light IL2 may be emitted by being refracted in the lower side direction (arrow direction D) and the upper side direction (arrow direction U), respectively.

Therefore, when the viewing angle limiting apparatus 1 according to one embodiment of the present disclosure is embodied as shown in FIG. 4A, the viewing angle limiting apparatus 1 may have a light profile as shown in FIG. 4C due to a light path based on FIG. 4B.

In FIG. 4C, a horizontal axis direction may be a second axis direction (e.g., Y-axis direction) of FIG. 4B, and a vertical axis direction may be a first axis direction (e.g., X-axis direction) of FIG. 4B. In this case, when a line horizontally crossing a center of a circle is a reference line RL, an upper side direction of the reference line RL may be the upper side direction (arrow direction U) of FIG. 4B, and a lower side direction of the reference line RL may be the lower side direction (arrow direction D) of FIG. 4B.

Referring to FIG. 4C, the viewing angle limiting apparatus 1 based on FIG. 4A may have an elliptical light profile which is long in a horizontal direction rather than a vertical direction. This is because that the viewing angle limiting apparatus 1 based on FIG. 4A more limits a viewing angle of the first axis direction (e.g., X-axis direction) than that of the second axis direction (e.g., Y-axis direction). This may equally be applied to a viewing angle limiting apparatus based on FIGS. 5A to 7A.

As shown in FIG. 4C, luminance (or intensity of light) of light may be deteriorated toward an outer side of a circle from the center of the circle. In this case, the outer side of an ellipse is an area where the image light IL does not reach, and may mean an area having luminance of 0.

As described in FIG. 4B, since the first image light IL1 is emitted by being refracted at the first emission angle IL1θ1 in the lower side direction (arrow direction D), the first image light may be emitted to a lower side of the ellipse where the image light IL reaches, to reach about −10 in the lower side direction (arrow direction D), as shown in FIG. 4C. Since the second image light IL2 is emitted by being refracted at the second emission angle IL2θ1 in the upper side direction (arrow direction U), the second image light may be emitted to an upper side of the ellipse where the image light IL reaches, to reach about +10 in the upper side direction (arrow direction U), as shown in FIG. 4C. For example, the first emission angle IL1θ1 and the second emission angle IL2θ1 may be equal to each other, and may be 30° or less.

Consequently, when the viewing angle limiting apparatus 1 according to one embodiment of the present disclosure is embodied as shown in FIG. 4A, a light profile may be formed to reach about 10 in the upper and lower side directions as shown in FIG. 4C, and the image light IL does not reach an area that exceeds 10 in each of the upper and lower side directions, whereby the user's viewing angle for the image light IL may be limited. Meanwhile, when the viewing angle limiting apparatus 1 according to one embodiment of the present disclosure is embodied as shown in FIG. 4A, a light profile may be formed to have a symmetrical shape based on the reference line RL. This is because that the first lower light shielding member 131a is disposed at the center between the first upper light shielding member 231a and the second upper light shielding member 231b and thus the length of the first side S1 and the length of the second side S2 are provided to be equal to each other. In this case, window reflection in the wind shield and the driver's viewing angle range for the image may be limited in the first axis direction (X-axis direction).

Then, referring to FIGS. 5A to 5C, in the viewing angle limiting apparatus 1 according to one embodiment of the present disclosure, the second embodiment related to the arrangement position of the lower light shielding member and the upper light shielding member is the same as the viewing angle limiting apparatus 1 based on FIG. 4A except that one end of the first lower light shielding member 131a and one end of the first upper light shielding member 231a are spaced apart from each other at the second interval G2 greater than the first interval G1. Therefore, the same reference numerals are given to the same elements, and elements different from those of FIG. 4A will be described hereinafter.

In case of the aforementioned viewing angle limiting apparatus based on FIG. 4A, the first lower light shielding member 131a and the first upper light shielding member 231a are disposed to be spaced apart from each other at the first interval G1. Therefore, in case of the viewing angle limiting apparatus based on FIG. 4A, since the first image light IL1 is emitted by being refracted at the first emission angle IL1θ1 in the lower side direction (arrow direction D) and the second image light IL2 is emitted by being refracted at the second emission angle IL2θ1 in the upper side direction (arrow direction U), the viewing angle limiting apparatus has the light profile of about 10 in each of the upper and lower side directions based on the reference line RL, whereby the user's viewing angle for the image light IL may be limited in the first axis direction (e.g., X-axis direction).

On the other hand, in case of the second embodiment related to the arrangement position of the lower light shielding member and the upper light shielding member of FIG. 5A, the first lower light shielding member 131a and the first upper light shielding member 231a are disposed to be spaced apart from each other at the second interval G2 greater than the first interval G1. Therefore, the viewing angle limiting apparatus 1 based on FIG. 5A may be provided such that the length of the first side S1 is equal to that of the second side S2 and the length of the first side S1 or the length of the second side S2 is longer than that of the third side S3. In case of the viewing angle limiting apparatus based on FIG. 5A, since the first image light IL1 is emitted by being refracted at the first emission angle IL1θ2 in the lower side direction (arrow direction D) and the second image light IL2 is emitted by being refracted at the second emission angle IL2θ2 in the upper side direction (arrow direction U), the viewing angle limiting apparatus has a light profile of about 20 in each of the upper and lower side directions based on the reference line RL as shown in FIG. 5C, whereby the user's viewing angle for the image light IL may be more mitigated and limited in the first axis direction (X-axis direction). The first emission angle IL1θ2 and the second emission angle IL2θ2 may be equal to each other, and may be 30° or less.

Consequently, the viewing angle limiting apparatus 1 according to one embodiment of the present disclosure may have a greater light profile in the upper and lower side directions as the spaced interval between the first lower light shielding member 131a and the first upper light shielding member 231a is greater in the second axis direction (e.g., Y-axis direction), whereby the user's viewing angle for the image light IL may be more mitigated. In this case, window reflection in the first axis direction (e.g., X-axis direction) and the driver's viewing angle range for the image may be more mitigated than the case of FIG. 4A.

Then, referring to FIGS. 6A to 6C, in the viewing angle limiting apparatus 1 according to one embodiment of the present disclosure, the third embodiment related to the arrangement position of the lower light shielding member and the upper light shielding member is the same as the viewing angle limiting apparatus 1 based on FIG. 4A except that the first lower light shielding member 131a is disposed to be closer to the first upper light shielding member 231a than the second upper light shielding member 231b. Therefore, the same reference numerals are given to the same elements, and elements different from those of FIG. 4A will be described hereinafter.

In case of the aforementioned viewing angle limiting apparatus based on FIG. 4A, the first lower light shielding member 131a is disposed at the center between the first upper light shielding member 231a and the second upper light shielding member 231b. Therefore, the viewing angle limiting apparatus based on FIG. 4A has a symmetrical light profile of about 10 in each of the upper side direction (arrow direction U) and the lower side direction (arrow direction D), whereby the user's viewing angle for the image light IL may be limited in the first axis direction (e.g., X-axis direction).

On the other hand, in case of the third embodiment related to the arrangement position of the lower light shielding member and the upper light shielding member of FIG. 6A, the first lower light shielding member 131a is disposed to be closer to the first upper light shielding member 231a than the second upper light shielding member 231b. That is, the first distance D1 of the first upper light shielding member 131a spaced apart from the first upper light shielding member 231a may be provided to be shorter than the second distance D2 of the first lower light shielding member 131a spaced apart from the second upper light shielding member 231b. Therefore, the viewing angle limiting apparatus 1 based on FIG. 6A may be provided such that the length of the first side S1 is different from that of the second side S2, the length of the second side S2 is longer than that of the first side S1, and the length of the third side S3 is loner than or equal to that of the second side S2. In case of the viewing angle limiting apparatus based on FIG. 6A, since the first image light IL1 is emitted by being refracted at a first emission angle IL1θ3 in the lower side direction (arrow direction D) and the second image light IL2 is emitted by being refracted at a second emission angle IL2θ3 in the upper side direction (arrow direction U) as shown in FIG. 6B, the viewing angle limiting apparatus has an asymmetrical light profile of about +10 in the upper side direction (arrow direction U) and −20 in the lower side direction (arrow direction D) based on the reference line RL as shown in FIG. 6C, whereby the user's viewing angle for the image light IL may be limited. In this case, window reflection in the first axis direction (e.g., X-axis direction) may be limited as shown in FIG. 4A and the driver's viewing angle range for the image may be more mitigated and limited than the case of FIG. 4A. The first emission angle IL1θ3 may be greater than the second emission angle IL2θ3, and each of the first emission angle IL1θ3 and the second emission angle IL2θ3 may be 30° or less.

Consequently, in the viewing angle limiting apparatus 1 according to one embodiment of the present disclosure, the first lower light shielding member 131a is disposed to be closer to the first upper light shielding member 231a than the second upper light shielding member 231b without being positioned at the center between the first upper light shielding member 231a and the second upper light shielding member 231b, whereby the first emission angle IL1θ3 of the first image light IL1 emitted in the lower side direction (arrow direction D) may be greater than the second emission angle IL2θ3 of the second image light IL2 emitted in the upper side direction (arrow direction U). As a result, the viewing angle may be more limited in the upper side direction (arrow direction U) than the lower side direction (arrow direction D) based on the reference line RL, and the viewing angle in the lower side direction (arrow direction D) may be more mitigated than the viewing angle limiting apparatus based on FIG. 4A.

Then, referring to FIGS. 7A to 7C, in the viewing angle limiting apparatus 1 according to one embodiment of the present disclosure, the fourth embodiment related to the arrangement position of the lower light shielding member and the upper light shielding member is the same as the viewing angle limiting apparatus 1 based on FIG. 6A except that one end of the first lower light shielding member 131a and one end of the first upper light shielding member 231a are spaced apart from each other at the second interval G2 greater than the first interval G1. Therefore, the same reference numerals are given to the same elements, and elements different from those of FIG. 6A will be described hereinafter.

In case of the aforementioned viewing angle limiting apparatus based on FIG. 6A, the first lower light shielding member 131a and the first upper light shielding member 231a are disposed to be spaced apart from each other at the first interval G1. Therefore, in case of the viewing angle limiting apparatus based on FIG. 6A, since the first image light IL1 is emitted by being refracted at the first emission angle IL1θ3 greater than the second emission angle IL2θ3 in the lower side direction (arrow direction D) and the second image light IL2 is emitted by being refracted at the second emission angle IL2θ3 in the upper side direction (arrow direction U), the viewing angle limiting apparatus has a light profile of about +10 in the upper side direction (arrow direction U) based on the reference line RL and a light profile of about −20 in the lower side direction (arrow direction D), whereby the user's viewing angle for the image may be more mitigated than window reflection in the first axis direction (e.g., X-axis direction).

On the other hand, in case of the third embodiment related to the arrangement position of the lower light shielding member and the upper light shielding member of FIG. 7A, the first lower light shielding member 131a and the first upper light shielding member 231a are disposed to be spaced apart from each other at the second interval G2 greater than the first interval G1. Therefore, the viewing angle limiting apparatus 1 based on FIG. 7A may be provided such that the length of the first side S1 is different from that of the second side S2, the length of the second side S2 is longer than that of the third side S3, and the length of the second side S2 is longer than that of the first side S1. Therefore, in case of the viewing angle limiting apparatus based on FIG. 7A, since the first image light IL1 is emitted by being refracted at a first emission angle IL1θ4 in the lower side direction (arrow direction D) and the second image light IL2 is emitted by being refracted at a second emission angle IL2θ4 in the upper side direction (arrow direction U) as shown in FIG. 7B, the viewing angle limiting apparatus has a light profile of about +20 in the upper side direction based on the reference line RL and a light profile of about −30 in the lower side direction (arrow direction D) as shown in FIG. 7C, whereby the viewing angle limiting apparatus may have an asymmetrical light profile wider than the viewing angle limiting apparatus based on FIG. 6A in the first axis direction (e.g., X-axis direction). The first emission angle IL1θ4 may be greater than the second emission angle IL2θ4, and each of the first emission angle IL1θ4 and the second emission angle IL2θ4 may be 30° or less.

Consequently, in the viewing angle limiting apparatus 1 according to one embodiment of the present disclosure, the first lower light shielding member 131a is disposed to be closer to the first upper light shielding member 231a than the second upper light shielding member 231b without being positioned at the center between the first upper light shielding member 231a and the second upper light shielding member 231b, and the first lower light shielding member 131a and the first upper light shielding member 231a are disposed to be spaced apart from the second interval G2 greater than the first interval G1 in the second axis direction (e.g., Y-axis direction). As a result, since the viewing angle limiting apparatus may have a light profile greater than that of the viewing angle limiting apparatus based on FIG. 6A in the upper and lower side directions, window reflection in the first axis direction (e.g., X-axis direction) and the driver's viewing angle range for the image may be more mitigated than the case of FIG. 6A.

Meanwhile, in the viewing angle limiting apparatus 1 based on FIGS. 6A and 7A, the case that the first distance D1 of the first upper light shielding member 131a spaced apart from the first upper light shielding member 231a is provided to be shorter than the second distance D2 of the first lower light shielding member 131a spaced apart from the second upper light shielding member 231b has been described by way of example. However, without limitation to this example, the first distance D1 may be provided to be longer than the second distance D2, whereby the viewing angle in the lower side direction (arrow direction D) may be more limited than that in the upper side direction (arrow direction U).

Figure 8A:
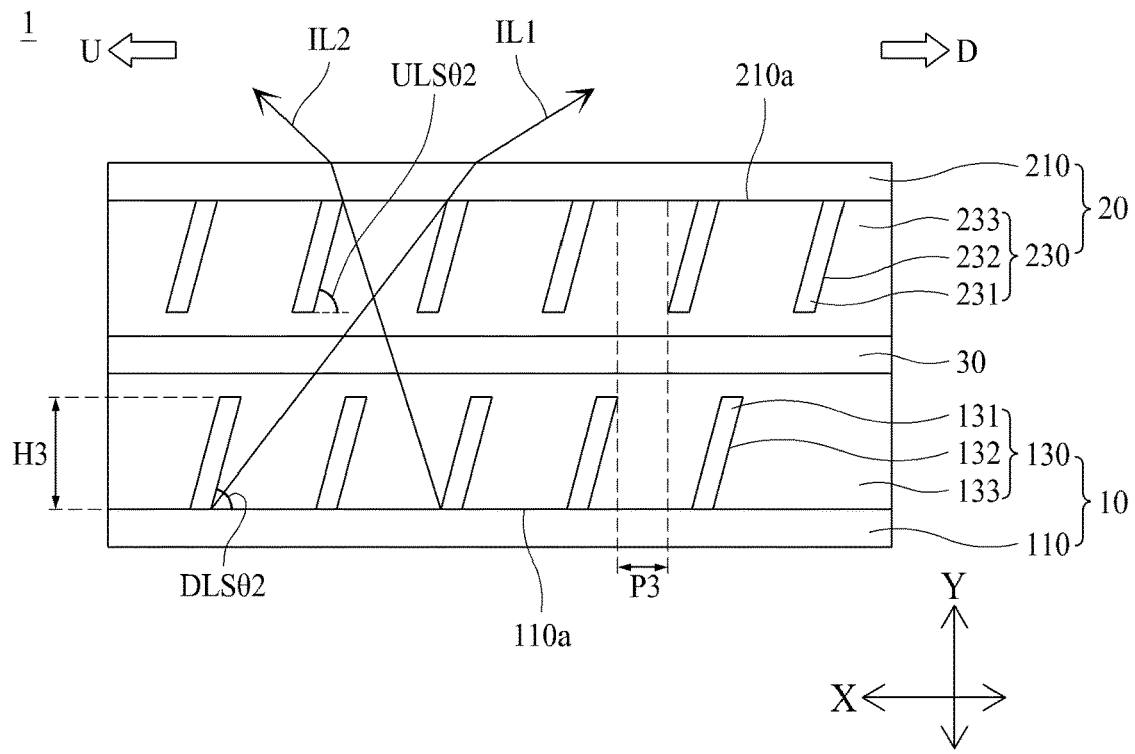
FIGS. 8A and 8B are schematic sectional views illustrating a viewing angle limiting apparatus according to the second embodiment of the present disclosure.
Figure 8B:
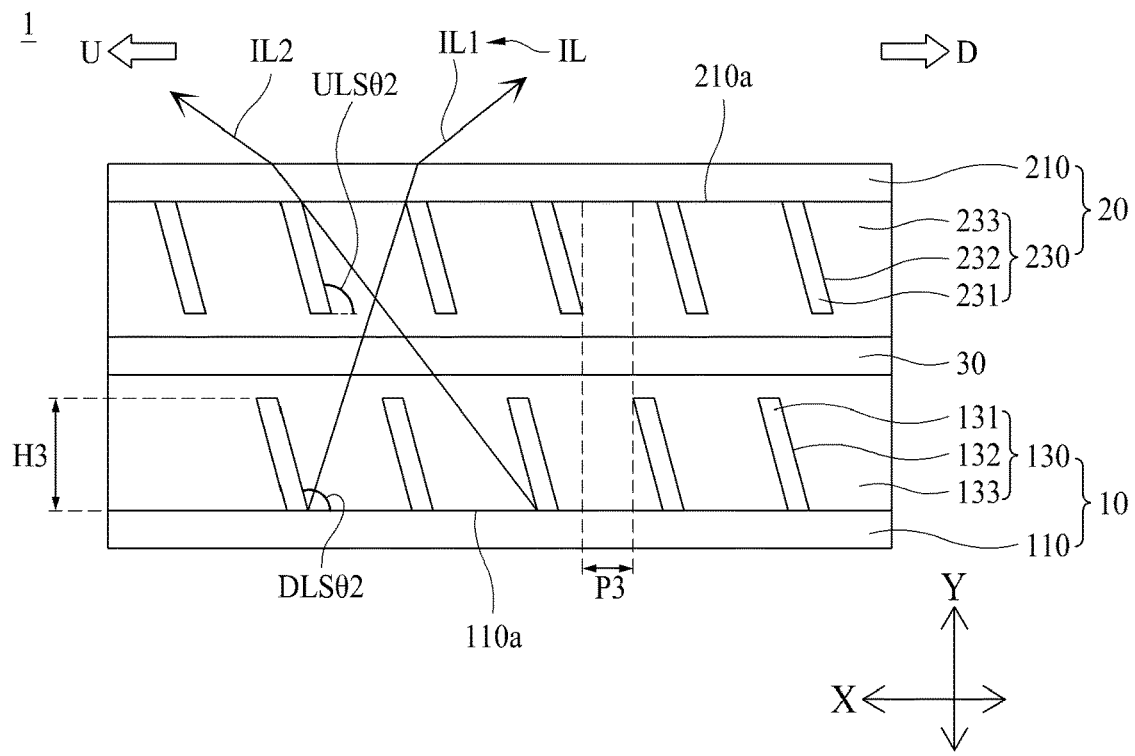

FIGS. 8A and 8B are schematic sectional views illustrating a viewing angle limiting apparatus according to the second embodiment of the present disclosure.

Referring to FIGS. 8A and 8B, the viewing angle limiting apparatus 1 according to the second embodiment of the present disclosure is the same as the viewing angle limiting apparatus 1 based on FIG. 2 except that each of the lower light shielding members 131 is disposed to be inclined with respect to the second axis direction (e.g., Y-axis direction) and each of the upper light shielding members 231 is disposed to be parallel with the lower light shielding members 131 disposed to be inclined. Therefore, the same reference numerals are given to the same elements, and elements different from those of FIG. 2 will be described hereinafter.

In case of the aforementioned viewing angle limiting apparatus based on FIG. 2, each of the lower light shielding member 131 and the upper light shielding member 231 is disposed to be perpendicular to the upper surface 110a of the first base film 110. In more detail, in case of the viewing angle limiting apparatus based on FIG. 2, each of a first angle DLSθ2 of the lower light shielding member 131 with respect to the upper surface 110a of the first base film 110 and a second angle ULSθ2 of the upper light shielding member 231 with respect to the upper surface 110a of the first base film 110 is 90°. That is, each of the lower light shielding members 131 and the upper light shielding members 231 is disposed to be parallel with the second axis direction (e.g., Y-axis direction). Therefore, the viewing angle limiting apparatus based on FIG. 2 may limit a viewing angle in at least one direction of the upper side direction (arrow direction U) or the lower side direction (arrow direction D) in accordance with an alternate level of each of the upper light shielding members 231 with respect to each of the lower light shielding members 131.

On the other hand, in case of the viewing angle limiting apparatus according to the second embodiment of FIG. 8A, each of the lower light shielding members 131 is disposed to be inclined with respect to the second axis direction (e.g., Y-axis direction), and each of the upper light shielding members 231 is disposed to be parallel with the lower light shielding members 131 disposed to be inclined. In more detail, in case of the viewing angle limiting apparatus based on FIG. 8A, the first angle DLSθ2 of the lower light shielding member 131 with respect to the upper surface 110a of the first base film 110 and the second angle DLSθ2 of the upper light shielding member 231 with respect to the upper surface 110a of the first base film 110 may have the same angle less than 90°. Therefore, as shown in FIG. 8A, one sides of the respective lower light shielding members 131 may be disposed to be alternate witch each other between the other sides of the respective upper light shielding members 231. Therefore, since the viewing angle limiting apparatus based on FIG. 8A has directionality in the lower side direction (arrow direction D), it may more mitigate a viewing angle range in the lower side direction (arrow direction D) and more limit the viewing angle range in the upper side direction (arrow direction U) than the viewing angle limiting apparatus based on FIG. 2.

In case of the viewing angle limiting apparatus based on FIG. 8B, the first angle DLSθ2 of the lower light shielding member 131 with respect to the upper surface 110a of the first base film 110 and the second angle DLSθ2 of the upper light shielding member 231 with respect to the upper surface 110a of the first base film 110 exceed 90° and may have the same angle. Therefore, as shown in FIG. 8B, one sides of the respective lower light shielding members 131 may be disposed to be alternate with each other between the other sides of the respective upper light shielding members 231. Therefore, since the viewing angle limiting apparatus based on FIG. 8B has directionality in the upper side direction (arrow direction U), it may more mitigate a viewing angle range in the upper side direction (arrow direction U) and more limit the viewing angle range in the lower side direction (arrow direction D) than the viewing angle limiting apparatus based on FIG. 2.

Meanwhile, in case of the viewing angle limiting apparatus based on FIG. 2, even though the lower light shielding members 131 are spaced apart from one another at the first pitch P1, the viewing angle limiting apparatus according to one embodiment of the present disclosure and a front user positioned in a line with the display apparatus in the second axis direction (e.g., Y-axis direction) may view an image emitted from the display apparatus while interfering with the lower light shielding members 131 as much as a width of each of the upper light shielding members 231. Since the width W1 of each of the lower light shielding members 131 is 1000 nm or less and the width W2 of each of the upper light shielding members 231 is also 1000 nm or less, the front user may view the image emitted from the display apparatus without almost interfering with the lower light shielding members 131 and the upper light shielding members 231.

On the other hand, in case of the viewing angle limiting apparatus according to the second embodiment of FIGS. 8A and 8B, since the lower light shielding member 131 and the upper light shielding member 231 are disposed to be inclined, the image light is partially shielded by the lower light shielding member 131 and the upper light shielding member 231, which are disposed to be inclined, whereby the front user may view an image with a limited viewing angle. That is, in case of the viewing angle limiting apparatus based on FIGS. 8A and 8B, a third pitch P3 formed between one side of the lower light shielding member 131 and the other side of the upper light shielding member 231 is narrower than that of the viewing angle limiting apparatus based on FIG. 2. Therefore, the front user may view an image with a narrower viewing angle than the viewing angle limiting apparatus based on FIG. 2.

Consequently, the viewing angle limiting apparatus 1 according to the second embodiment of the present disclosure may be provided such that the lower light shielding member 131 and the upper light shielding member 231 are disposed to be inclined with respect to the upper surface 110a of the first base film 110 and thus have directionality in the upper side direction (arrow direction U) or the lower side direction (arrow direction D). Therefore, the viewing angle limiting apparatus 1 may more mitigate the viewing angle range of any one of the upper side direction (arrow direction U) and the lower side direction (arrow direction D) and at the same time more limit the viewing angle range of the other one, and the front user may view an image with a more limited viewing angle than the viewing angle limiting apparatus based on FIG. 2 as the image light is partially shielded by the lower light shielding member 131 and the upper light shielding member 231 disposed to be inclined.

Meanwhile, in the viewing angle limiting apparatus 1 according to one embodiment of the present disclosure, when a viewing angle required by a user is about 74°, a ratio of the first height H1 to the first pitch P1 is 1:1.5. Therefore, since the viewing angle limiting apparatus 1 according to the second embodiment of the present disclosure is provided at the third pitch P3 narrower than the first pitch P1, a third height H3 of the lower light shielding member 131 may be provided to be lower than the first height H1 to satisfy the ratio of 1:1.5. Since the lower light shielding member 131 is disposed to be perpendicular to the upper surface 110a of the first base film 110, the first height H1 may be the length of the lower light shielding member 131. However, since the lower light shielding member 131 is disposed to be inclined with respect to the upper surface 110a of the first base film 110, the third height H3 may be a length from the upper surface of the first base film 110 to an end of one side of the lower light shielding member 131.

In the viewing angle limiting apparatus 1 according to one embodiment of the present disclosure, since each of the lower light shielding members 131 and each of the upper light shielding members 231 are disposed to be perpendicular to the upper surface 110a of the first base film 110, it may be considered that each of the first insertion grooves 132 in which the lower light shielding members 131 are respectively disposed is disposed to be perpendicular to the upper surface 110a of the first base film 110 and each of the second insertion grooves 232 in which the upper light shielding members 231 are respectively disposed is disposed to be parallel with each of the first insertion grooves 132.

Also, in the viewing angle limiting apparatus 1 according to the second embodiment of the present disclosure, since each of the lower light shielding members 131 and each of the upper light shielding members 231 are disposed to be inclined with respect to the upper surface 110a of the first base film 110, it may be considered that each of the first insertion grooves 132 in which the lower light shielding members 131 are respectively disposed is disposed to be inclined with respect to the upper surface 110a of the first base film 110 and each of the second insertion grooves 232 in which the upper light shielding members 231 are respectively disposed is disposed to be parallel with each of the first insertion grooves 132.

Figure 9A:
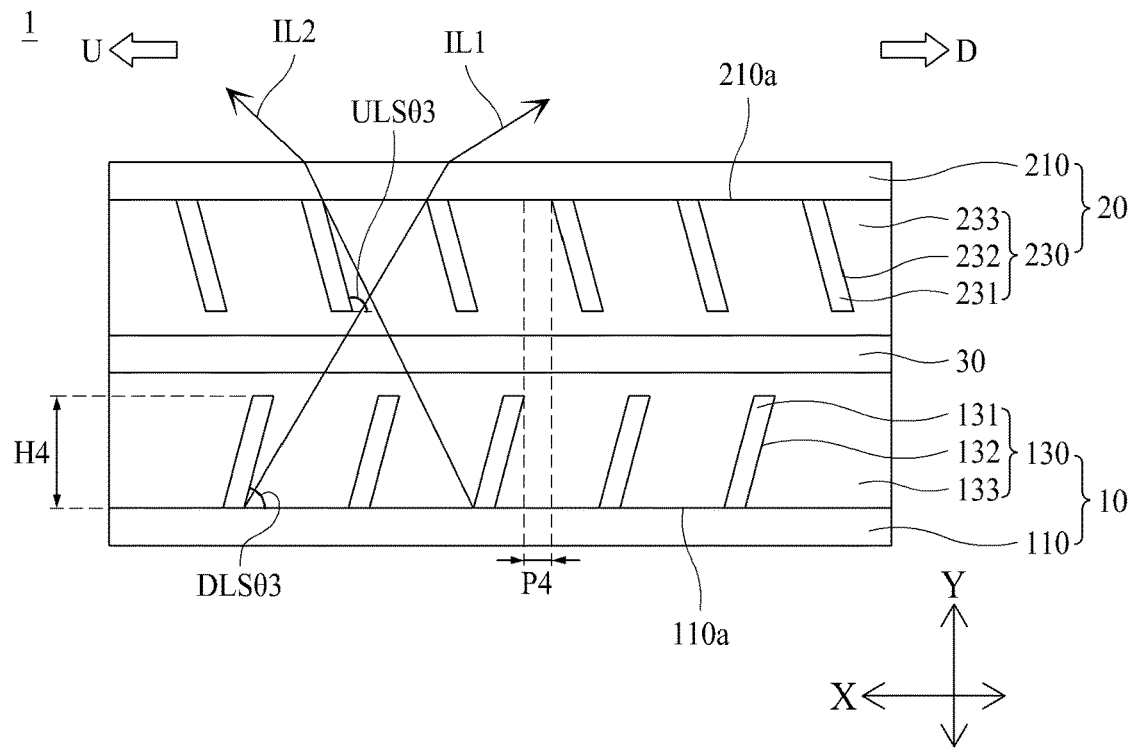
FIGS. 9A and 9B are schematic sectional views illustrating a viewing angle limiting apparatus according to the third embodiment of the present disclosure.
Figure 9B:
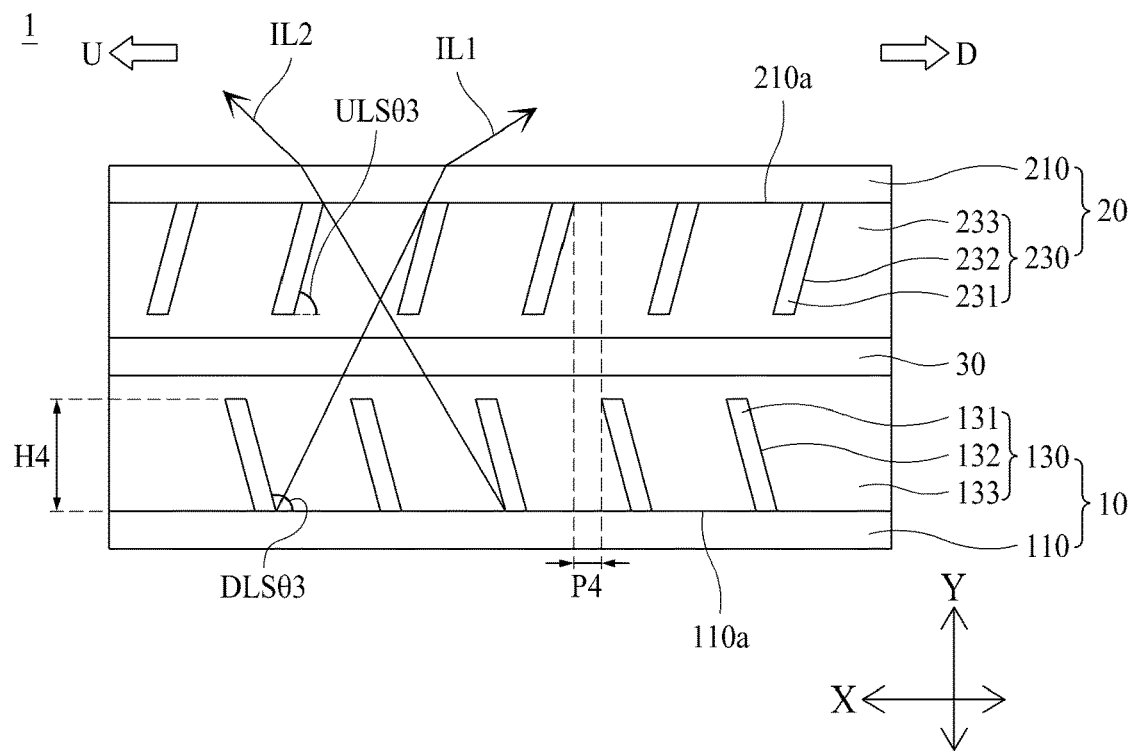

FIGS. 9A and 9B are schematic sectional views illustrating a viewing angle limiting apparatus according to the third embodiment of the present disclosure.

Referring to FIGS. 9A and 9B, the viewing angle limiting apparatus 1 according to the third embodiment of the present disclosure is the same as the viewing angle limiting apparatus 1 based on FIG. 8A except that each of the upper light shielding members 231 is disposed to be inclined in a direction different from that of the lower light shielding members 131 disposed to be inclined. Therefore, the same reference numerals are given to the same elements, and elements different from those of FIG. 8A will be described hereinafter.

In case of the aforementioned viewing angle limiting apparatus based on FIG. 8A, the lower light shielding member 131 and the upper light shielding member 231 are disposed to be inclined in the same direction with respect to the upper surface 110a of the first base film 110. Therefore, in case of the viewing angle limiting apparatus based on FIG. 8A, the lower light shielding member 131 and the upper light shielding member 231 may be provided to have the same directionality in the upper side direction (arrow direction U) or the lower side direction (arrow direction D), whereby a viewing angle range of any one of the upper side direction (arrow direction U) and the lower side direction (arrow direction D) may be more mitigated and a viewing angle range of the other one may be more limited. Also, the image light is partially shielded by the lower light shielding member 131 and the upper light shielding member 231, which are disposed to be inclined, whereby the front user may view an image with a more limited viewing angle than the viewing angle limiting apparatus based on FIG. 2.

On the other hand, in case of the viewing angle limiting apparatus according to the second embodiment of FIG. 9A, each of the lower light shielding members 131 is disposed to be inclined with respect to the second axis direction (e.g., Y-axis direction), and each of the upper light shielding members 231 is disposed to be inclined in a direction different from that of the lower light shielding members 131 disposed to be inclined. In more detail, in case of the viewing angle limiting apparatus based on FIG. 9A, a first angle DLSθ3 of the lower light shielding member 131 with respect to the upper surface 110a of the first base film 110 may be less than 90°, and a second angle ULSθ3 of the upper light shielding member 231 with respect to the upper surface 110a of the first base film 110 may exceed 90°. Therefore, in case of the viewing angle limiting apparatus based on FIG. 9A, one sides of the respective lower light shielding members 131 may be disposed to be alternate witch each other between the other sides of the respective upper light shielding members 231. The lower light shielding members 131 may have directionality in the lower side direction (arrow direction D), and the upper light shielding members 231 may have directionality in the upper side direction (arrow direction U). Therefore, the viewing angle limiting apparatus based on FIG. 9A may more limit a viewing angle in the lower side direction (arrow direction D) and the upper side direction (arrow direction U) than the viewing angle limiting apparatus based on FIG. 8A, whereby an extreme viewing angle range may be embodied.

In case of the viewing angle limiting apparatus based on FIG. 9B, the first angle DLSθ3 of the lower light shielding member 131 with respect to the upper surface 110a of the first base film 110 may exceed 90° and the second angle ULSθ3 of the upper light shielding member 231 with respect to the upper surface 110a of the first base film 110 may be less than 90°. Therefore, in case of the viewing angle limiting apparatus based on FIG. 9B, one sides of the respective lower light shielding members 131 may be disposed to be alternate with each other between the other sides of the respective upper light shielding members 231, the lower light shielding members 131 may have directionality in the upper side direction (arrow direction U), and the upper light shielding members 231 may have directionality in the lower side direction (arrow direction D). Therefore, the viewing angle limiting apparatus based on FIG. 9B may more limit a viewing angle in the lower side direction (arrow direction D) and the upper side direction (arrow direction U) than the viewing angle limiting apparatus based on FIG. 8A, whereby an extreme viewing angle range may be embodied.

Meanwhile, in case of the viewing angle limiting apparatus based on FIGS. 8A and 8B, since the lower light shielding member 131 and the upper light shielding member 231 are disposed to be inclined in the same direction, the front user may view an image with a more limited viewing angle than the viewing angle limiting apparatus based on FIG. 2 through the third pitch P3 formed between one side of the lower light shielding member 131 and the other side of the upper light shielding member 231.

On the other hand, in case of the viewing angle limiting apparatus based on FIGS. 9A and 9B, since the lower light shielding member 131 and the upper light shielding member 231 are disposed to be inclined in their respective directions different from each other, the front user may view an image with a more limited viewing angle than the viewing angle limiting apparatus based on FIG. 8A between one side of the lower light shielding member 131 and one side of the upper light shielding member 231 through a fourth pitch P4 formed to be narrower than the third pitch P3.

Consequently, the viewing angle limiting apparatus 1 according to the third embodiment of the present disclosure may be provided such that the lower light shielding member 131 and the upper light shielding member 231 are disposed to be inclined in different directions with respect to the upper surface 110a of the first base film 110 and thus have their respective directionalities different from each other, whereby the viewing angle range may be more limited than the viewing angle limiting apparatus based on FIG. 8A. The front user may view an image with an extremely limited viewing angle as the image light is more shielded due to the lower light shielding member 131 and the upper light shielding member 231, which are disposed to be inclined in different directions, than the viewing angle limiting apparatus based on FIG. 8A.

Meanwhile, in the viewing angle limiting apparatus 1 according to one embodiment of the present disclosure, when a viewing angle required by a user is about 74°, a ratio of the first height H1 to the first pitch P1 is 1:1.5. Therefore, since the viewing angle limiting apparatus 1 according to the third embodiment of the present disclosure is provided at the fourth pitch P4 narrower than the third pitch P3, a fourth height H4 of the lower light shielding member 131 may be provided to be lower than the third height H3 to satisfy the ratio of 1:1.5. Since the lower light shielding member 131 is disposed to be perpendicular to the upper surface 110a of the first base film 110, the first height H1 may be the length of the lower light shielding member 131. However, since the lower light shielding member 131 is disposed to be inclined with respect to the upper surface 110a of the first base film 110, the fourth height H4 may be a length from the upper surface of the first base film 110 to an end of one side of the lower light shielding member 131.

In the viewing angle limiting apparatus 1 according to one embodiment of the present disclosure, since each of the lower light shielding members 131 and each of the upper light shielding members 231 are disposed to be inclined in different directions with respect to the upper surface 110a of the first base film 110, it may be considered that each of the first insertion grooves 132 in which the lower light shielding members 131 are respectively disposed and each of the second insertion grooves 232 in which the upper light shielding members 231 are respectively disposed are disposed to be inclined in different directions with respect to the upper surface 110a of the first base film 110.

The case that the viewing angle limiting apparatus 1 according to the present disclosure is provided such that each of the lower light shielding members 131 and each of the upper light shielding members 231 are single layers has been described as above but the present disclosure is not limited thereto. Each of the lower light shielding members 131 and each of the upper light shielding members 231 may be provided by a plurality of layers for shielding light. For example, each of the lower light shielding members 131 and each of the upper light shielding members 231 may be provided such that a semi-transmissive layer, a light absorbing layer and a reflective layer are deposited, thereby shielding light.

Also, the case that the viewing angle limiting apparatus 1 according to the present disclosure limits the viewing angle of the first axis direction (e.g., X-axis direction) has been described as above but the present disclosure is not limited thereto. The viewing angle limiting apparatus 1 according to the present disclosure may be rotated at 90° to limit the viewing angle of the second axis direction (e.g., Y-axis direction).

The viewing angle limiting apparatus according to one embodiment of the present disclosure may be applied to all of electronic devices that include a display panel. For example, the viewing angle limiting apparatus according to the present disclosure may be applied to (or mounted on) a display apparatus as a viewing angle limiting pattern. For example, the viewing angle limiting apparatus according to the present disclosure may be applied to a mobile device, a video phone, a smart watch, a watch phone, a wearable device, a foldable device, a rollable device, a bendable device, a flexible device, a curved device, an electronic diary, electronic book, a portable multimedia player (PMP), a personal digital assistant (PDA), an MP3 player, a mobile medical device, a desktop PC, a laptop PC, a netbook computer, a workstation, a navigator, a vehicle navigator, a vehicle display device, a television, a wall paper display device, a signage device, a game device, a notebook computer, a monitor, a camera, a camcorder, home appliances, etc.

The display apparatus comprising the viewing angle limiting apparatus according to one embodiment of the present disclosure may comprise a display panel including a plurality of pixels for displaying an image, and a viewing angle limiting panel coupled to the display panel, wherein the viewing angle limiting panel may include a viewing angle limiting apparatus shown in FIGS. 1 to 9B. For example, the viewing angle limiting panel may be disposed on a front surface of the display panel or attached onto the front surface of the display panel by an adhesive member. The display apparatus comprising the viewing angle limiting apparatus may emit the image light emitted from the display panel within a preset angle range, whereby the user's viewing angle for the image may be limited, and as a result, the user's privacy may be protected.

In the viewing angle limiting apparatus and the display apparatus comprising the same according to the present disclosure, the plurality of light shielding members are provided to be spaced apart from one another up and down and disposed alternately, whereby a length of each of the light shielding members spaced apart from one another up and down may be formed to be short. Therefore, the light shielding members may be manufactured more easily than the case that one light shielding member is provided longitudinally up and down, and a defect rate may be lowered, whereby productivity may be enhanced.

In addition to the effects of the present disclosure as mentioned above, additional effects and features of the present disclosure will be clearly understood by those skilled in the art from the following description of the present disclosure.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is intended to cover all variations or modifications derived from the meaning, scope, and equivalent concept of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising: a first optical member having a plurality of lower light shielding members; and a second optical member having a plurality of upper light shielding members, the second optical member facing the first optical member, wherein each of the plurality of upper light shielding members is spaced apart from each of the plurality of lower light shielding members in a first direction of the first optical member and disposed to be alternate with each of the plurality of lower shielding members, wherein each of the lower light shielding members is disposed to be inclined with respect to the first direction of the first optical member, wherein each of the upper light shielding members is disposed to be inclined in a direction different from that of the lower light shielding members disposed to be inclined, and wherein, from a plan view, each of the plurality of upper light shielding members and each of the plurality of lower light shielding members are spaced apart and have a gap such that each of the plurality of upper light shielding members do not overlap with each of the plurality of lower light shielding members, wherein the first optical member includes: a first base film; and a first optical layer disposed on the first base film, wherein the second optical member includes: a second base film; and a second optical layer disposed on the second base film.

2. The apparatus of claim 1, wherein:
the plurality of lower light shielding members are spaced apart from one another in a second direction perpendicular to the first direction of the first optical member,
the plurality of upper light shielding members are spaced apart from one another in the second direction, and
a first lower light shielding member among the lower light shielding members is disposed between a first upper light shielding member and a second upper light shielding member, which are disposed to be adjacent to each other, among the upper light shielding members with respect to the second direction.

3. The apparatus of claim 2, wherein:
each of the lower light shielding members is formed with a first height,
the lower light shielding members are spaced apart from one another at a first pitch along the second direction, and
a ratio of the first height to the first pitch is 1:1.5 or less.

4. The apparatus of claim 2, further comprising:
a first side connecting one end of the first lower light shielding member with one end of the first upper light shielding member;
a second side connecting one end of the first lower light shielding member with one end of the second upper light shielding member; and
a third side connecting the first side with the second side.

5. The apparatus of claim 4, wherein:
a length of the first side is equal to that of a length of the second side, and is shorter than or equal to that of a length of the third side, or
a length of the first side is equal to that of a length of the second side, and is longer than that of a length of the third side.

6. The apparatus of claim 4, wherein:
a length of the first side is different from that of a length of the second side, or the length of the second side is longer than that of the length of the first side, and
a length of the third side is longer than or equal to that of the length of the second side.

7. The apparatus of claim 4, wherein:
a length of the first side is different from that of a length of the second side, and
the length of the second side is longer than of a length of the third side or is longer than that of the length of the first side.

8. The apparatus of claim 1, wherein the first optical layer includes a first optical pattern and a plurality of first insertion grooves disposed to be spaced apart from one another in a second direction perpendicular to the first direction of the first optical member in the first optical pattern, and wherein the lower light shielding member is disposed in the first insertion groove.

9. The apparatus of claim 8, wherein the second optical layer includes a second optical pattern and a plurality of second insertion grooves disposed to be spaced apart from one another in the second direction in the second optical pattern, and wherein the upper light shielding member is disposed in the second insertion groove.

10. The apparatus of claim 9, further comprising an intermediate layer disposed between the first optical layer and the second optical layer.

11. An apparatus comprising:
a first base film;
a second base film facing the first base film;
a first optical layer having a plurality of lower light shielding members disposed on the first base film;
a second optical layer having a plurality of upper light shielding members disposed on the second base film; and
an intermediate layer disposed between the first optical layer and the second optical layer,
wherein the respective lower light shielding members are disposed between the respective upper light shielding members,
wherein each of the lower light shielding members is disposed to be inclined with respect to a first direction of the first optical member,
wherein each of the upper light shielding members is disposed to be inclined in a direction different from that of the lower light shielding members disposed to be inclined,
wherein adjacent lower light shielding members are spaced apart from one another at a first pitch in the first direction,
wherein each of the upper light shielding members has a selected width in the first direction, and wherein the selected width of each of the upper light shielding members is smaller than the first pitch between the adjacent lower light shielding members such that each of the of upper light shielding members do not overlap with each of the lower light shielding members from a plan view.

12. The apparatus of claim 11, wherein:
the first optical layer includes a first optical pattern and a plurality of first insertion grooves disposed to be spaced apart from one another in a first axis direction in the first optical pattern,
the second optical layer includes a second optical pattern and a plurality of second insertion grooves disposed to be spaced apart from one another in the first axis direction in the second optical pattern,
each of the lower light shielding members is disposed in each of the first insertion grooves,
each of the upper light shielding members is disposed in each of the second insertion grooves, and
a width of each of the first insertion grooves and a width of each of the second insertion grooves are 500 nm or more and 1000 nm or less.

13. The apparatus of claim 12, wherein:
each of the first insertion grooves is formed with a first height,
the first insertion grooves are spaced apart from one another at a second pitch, and
a ratio of the first height to the second pitch is 1:1.5 or less.

14. The apparatus of claim 12, wherein:
each of the first insertion grooves is disposed to be inclined with respect to an upper surface of the first base film, and
each of the second insertion grooves is disposed to be inclined in a direction different from each of the first insertion grooves.

15. A display apparatus comprising: a display panel displaying an image; and a viewing angle limiting panel coupled to the display panel, wherein the viewing angle limiting panel includes: a first optical member having a plurality of lower light shielding members; and a second optical member having a plurality of upper light shielding members, the second optical member facing the first optical member, wherein each of the plurality of upper light shielding members is spaced apart from each of the plurality of lower light shielding members in a first direction of the first optical member and disposed to be alternate with each of the plurality of lower shielding members, wherein, from a plan view, each of the plurality of upper light shielding members and each of the plurality of lower light shielding members are spaced apart and have a gap such that each of the plurality of upper light shielding members do not overlap with each of the plurality of lower light shielding members, wherein the first optical member includes: a first base film; and a first optical layer disposed on the first base film, wherein the second optical member includes: a second base film; and a second optical layer disposed on the second base film.

16. The display apparatus of claim 15, wherein:
each of the lower light shielding members has a first height,
adjacent lower light shielding members are spaced apart from each another at a first pitch in the first direction, and
a ratio of the first height to the first pitch is 1:1.5 or less.

17. The display apparatus of claim 15, further comprising:
a first side connecting one end of the first lower light shielding member with one end of the first upper light shielding member;
a second side connecting one end of the first lower light shielding member with one end of the second upper light shielding member; and
a third side connecting the first side with the second side.

18. The display apparatus of claim 17, wherein:
a length of the first side is equal to that of a length of the second side, and is shorter than or equal to that of a length of the third side, or
a length of the first side is equal to that of a length of the second side, and is longer than that of a length of the third side.

19. The display apparatus of claim 17, wherein:
a length of the first side is different from that of a length of the second side, or the length of the second side is longer than that of the length of the first side, and
a length of the third side is longer than or equal to that of the length of the second side.

20. The display apparatus of claim 15, further comprising an intermediate layer disposed between the first optical member and the second optical member,
wherein the intermediate layer is spaced apart from both the plurality of lower light shielding members and the plurality of upper light shielding members.

* * * * *